United States Patent [19]

Takaoka et al.

[11] Patent Number: 5,252,986
[45] Date of Patent: Oct. 12, 1993

[54] IMAGE PROCESSING METHOD FOR SUPERPOSING PLURAL DOTS ON A RECORDING MEDIUM AT A PREDETERMINED INTERVAL AND APPARATUS UTILIZING SAME

[75] Inventors: Makoto Takaoka, Tokyo; Susumu Sugiura, Atsugi; Kentaro Matsumoto, Kurume; Toyokazu Uda, Ohmiya; Masami Fukumoto, Sagamihara, all of Japan

[73] Assignee: Canon Kabushiki Kaisha, Tokyo, Japan

[21] Appl. No.: 684,498

[22] Filed: Apr. 15, 1991

Related U.S. Application Data

[63] Continuation of Ser. No. 519,323, May 7, 1990, abandoned, which is a continuation of Ser. No. 195,648, May 18, 1988, abandoned.

[30] Foreign Application Priority Data

May 20, 1987 [JP] Japan ............ 62-121148
May 20, 1987 [JP] Japan ............ 62-121149

[51] Int. Cl.$^5$ .................................. B41J 2/205
[52] U.S. Cl. ........................ 346/1.1; 346/140 R; 358/298
[58] Field of Search ............ 346/1.1, 140, 75; 358/298

[56] References Cited

U.S. PATENT DOCUMENTS 3,404,221 10/1968 Loughren ............ 346/75 X
3,947,851 3/1976 Chen ............ 346/75 X
4,353,079 10/1982 Kawanabe ............ 346/140 R
4,463,359 7/1984 Ayata et al. .
4,513,299 4/1985 Lee ............ 346/140
4,520,373 5/1985 Ayata et al. .
4,553,173 11/1985 Kawamura ............ 358/298 X
4,595,948 6/1986 Itoh et al. ............ 358/75
4,617,580 10/1986 Miyakawa .
4,620,196 10/1986 Hertz ............ 346/1.1
4,631,548 12/1986 Milbrandt ............ 346/1.1
4,686,538 8/1987 Kouzato .
4,714,964 12/1987 Sasaki ............ 346/140 X
4,721,968 1/1988 Arai et al. .
5,006,864 4/1991 Ayata et al. .
5,032,851 7/1991 Yoshimura ............ 346/140

FOREIGN PATENT DOCUMENTS 162963 12/1984 European Pat. Off. .

*Primary Examiner*—Joseph W. Hartary
*Attorney, Agent, or Firm*—Fitzpatrick, Cella, Harper & Scinto

[57] ABSTRACT

An image processing apparatus for recording image data using an ink jet recording method comprises: an ink jet nozzle to eject an ink droplet and deposit onto a paper; a controller to control the ink jet nozzle so as to enable the recording interval when the ink droplet is deposited on the same position on the paper a plurality of times; a supply circuit to supply image data to the ink jet nozzle; and a distinction circuit to discriminate whether the input image data is a half tone image or a diagram image, wherein this controller controls the recording interval in accordance with the result of the discrimination. With this apparatus, by superposing the recording dots on the same position on the paper in accordance with the binary image data, gradations and graininess can be improved by a simple structure.

26 Claims, 31 Drawing Sheets

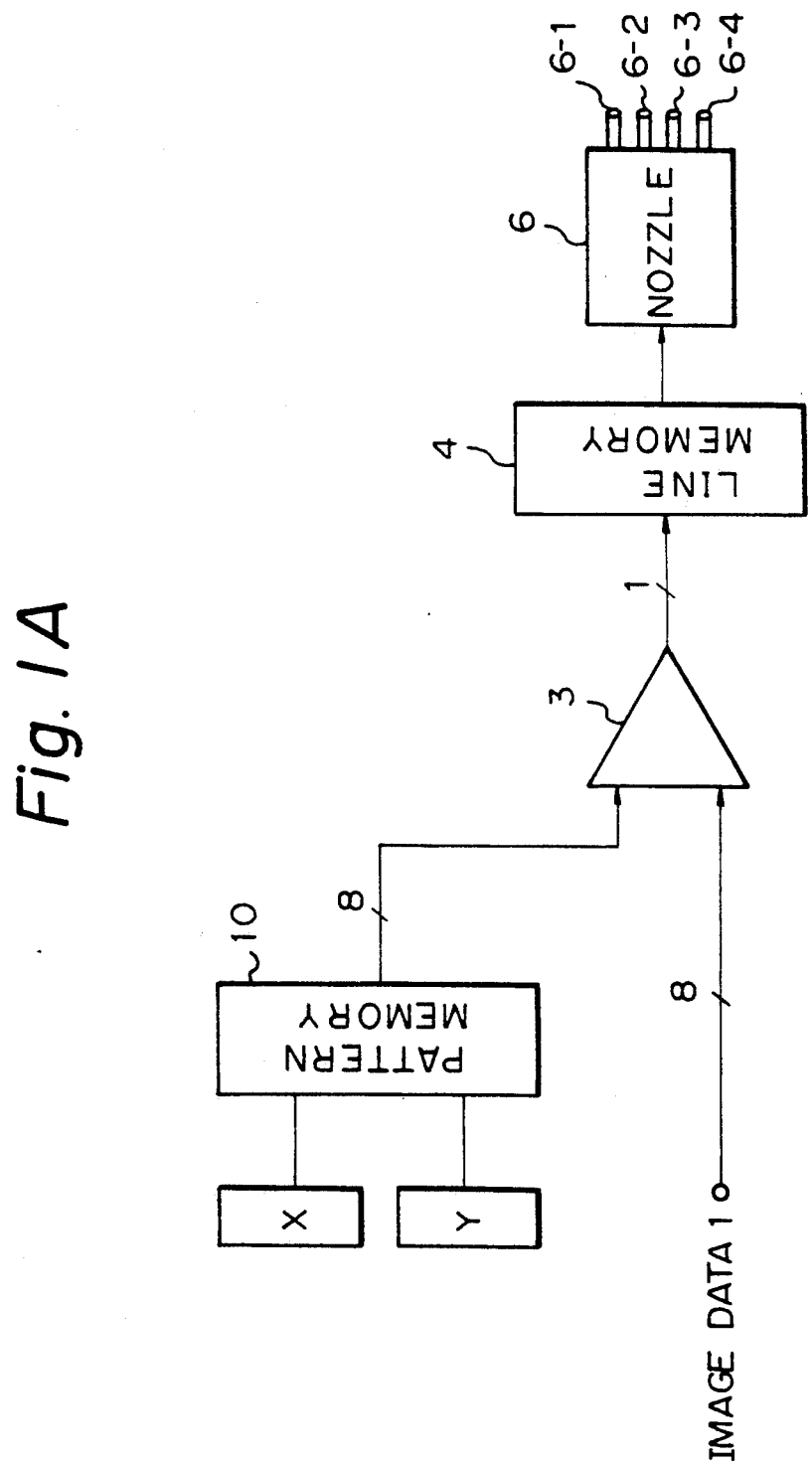

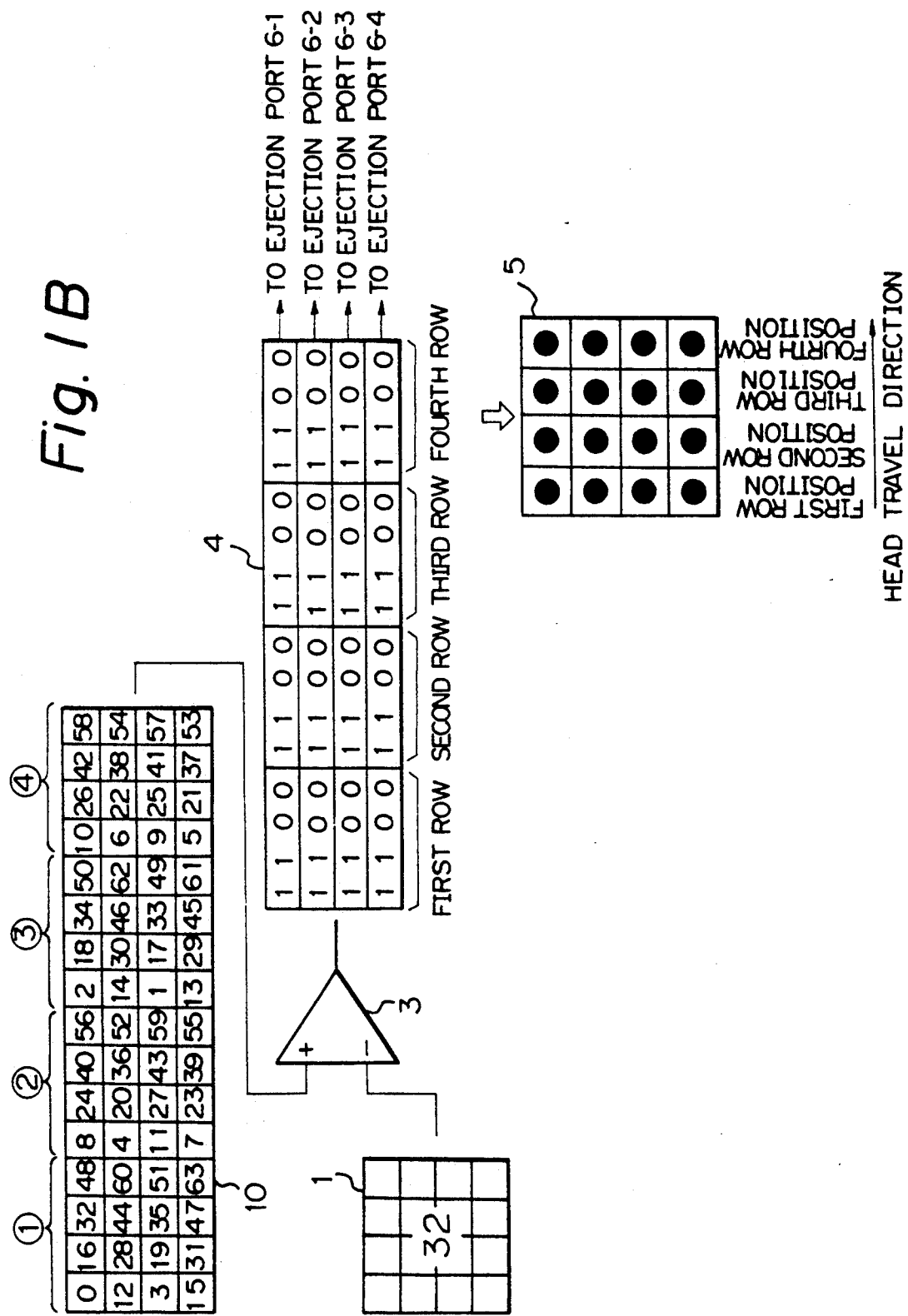

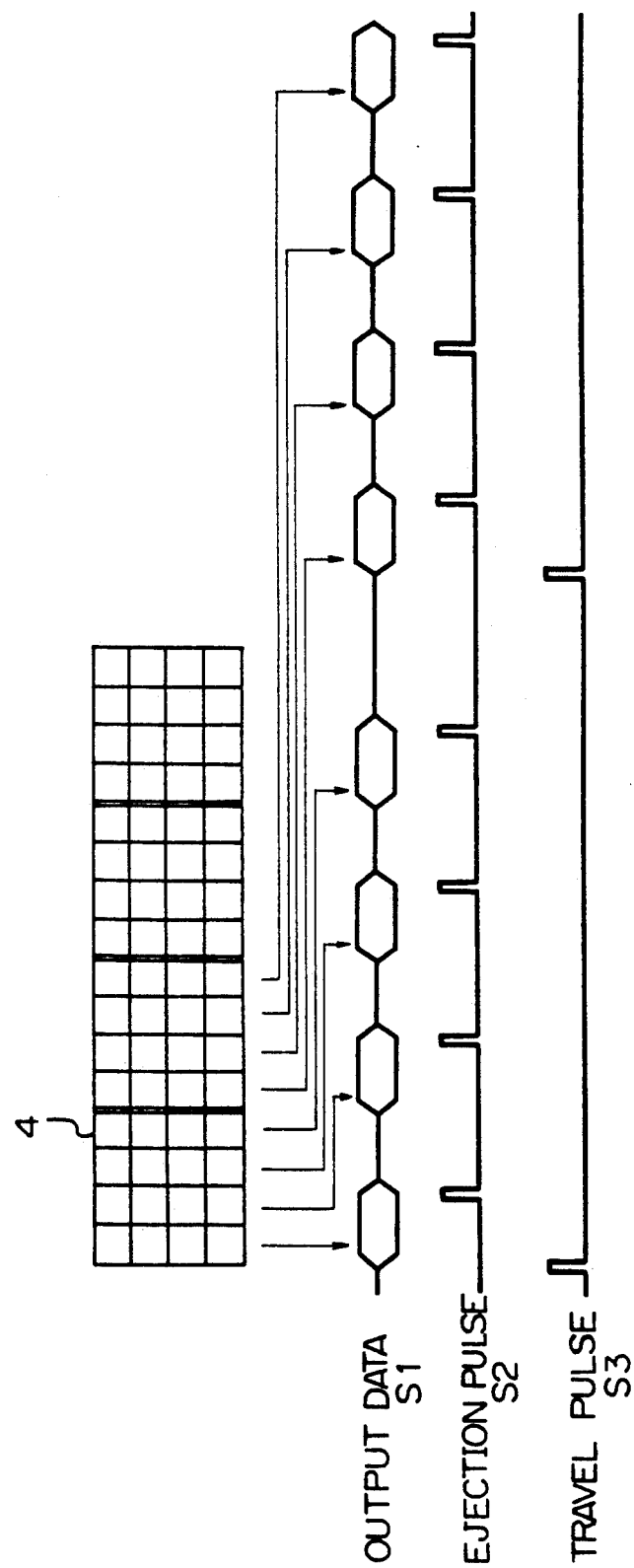

Fig.6A
| 0 | 16 | 32 | 48 | 8 | 24 | 40 | 56 | 2 | 18 | 34 | 50 | 10 | 26 | 42 | 58 |
|---|----|----|----|---|----|----|----|---|----|----|----|----|----|----|----|
| 12 | 28 | 44 | 60 | 4 | 20 | 36 | 52 | 14 | 30 | 46 | 62 | 6 | 22 | 38 | 54 |
| 3 | 19 | 35 | 51 | 11 | 27 | 43 | 59 | 1 | 17 | 33 | 49 | 9 | 25 | 41 | 57 |
| 15 | 31 | 47 | 63 | 7 | 23 | 39 | 55 | 13 | 29 | 45 | 61 | 5 | 21 | 37 | 53 |
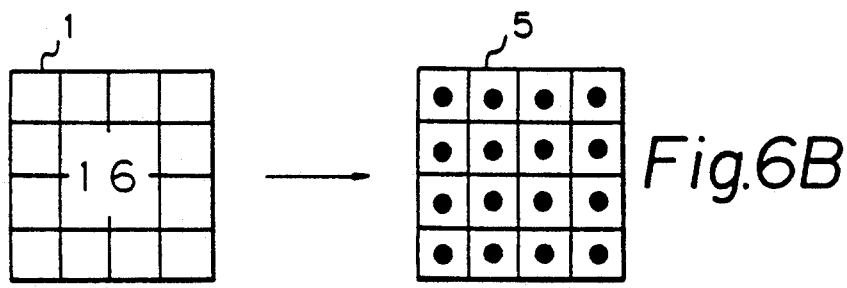
Fig.6B
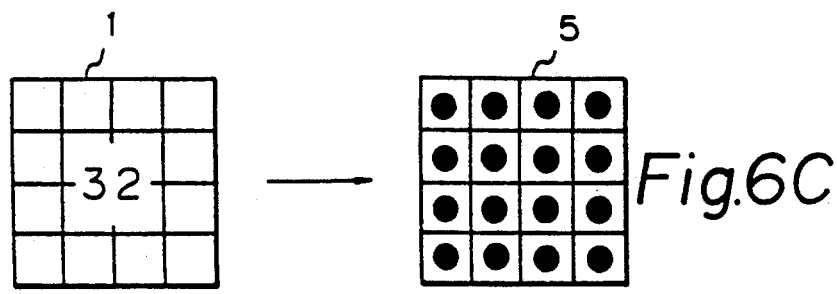
Fig.6C
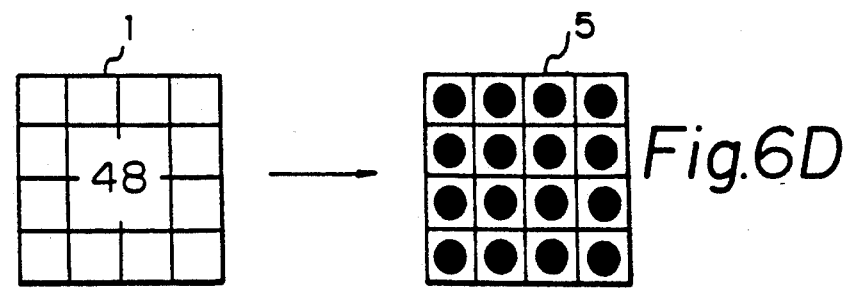
Fig.6D Fig. 7A
| 0 | 1 | 2 | 3 | 32 | 33 | 34 | 35 | 12 | 13 | 14 | 15 | 44 | 45 | 46 | 47 |
|---|---|---|---|----|----|----|----|----|----|----|----|----|----|----|----|
| 48 | 49 | 50 | 51 | 16 | 17 | 18 | 19 | 60 | 61 | 62 | 63 | 28 | 29 | 30 | 31 |
| 8 | 9 | 10 | 11 | 40 | 41 | 42 | 43 | 4 | 5 | 6 | 7 | 36 | 37 | 38 | 39 |
| 56 | 57 | 58 | 59 | 24 | 25 | 26 | 27 | 52 | 53 | 54 | 55 | 20 | 21 | 22 | 23 |
10B
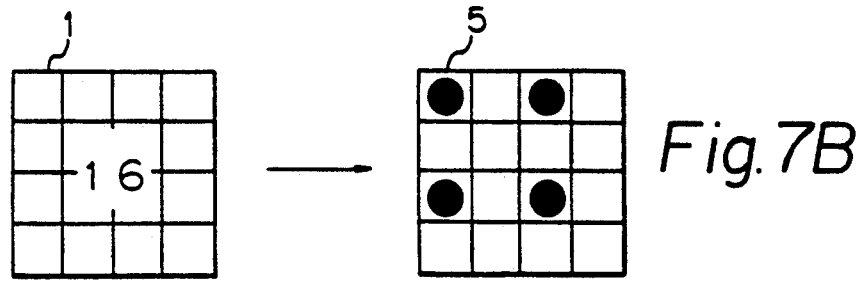
Fig. 7B
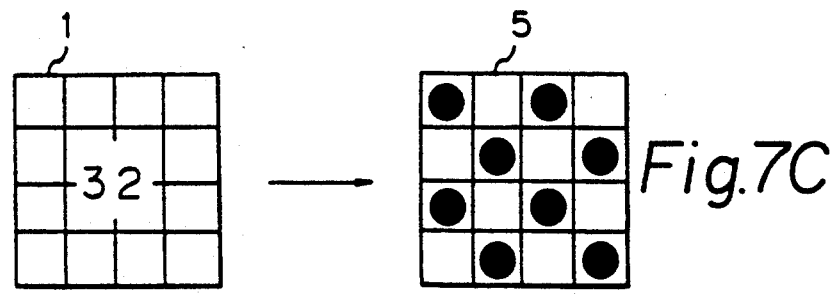
Fig. 7C
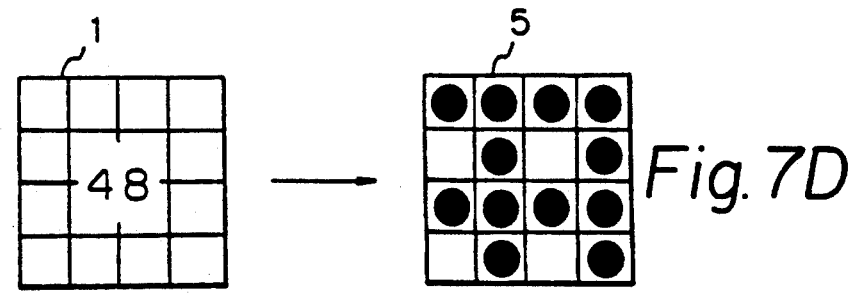
Fig. 7D

Fig. 8A
| 0 | 1 | 32 | 33 | 16 | 17 | 48 | 49 | 4 | 5 | 36 | 37 | 20 | 21 | 52 | 53 |
|---|---|----|----|----|----|----|----|---|---|----|----|----|----|----|----|
| 24 | 25 | 56 | 57 | 8 | 9 | 40 | 41 | 28 | 29 | 60 | 61 | 12 | 13 | 44 | 45 |
| 6 | 7 | 38 | 39 | 22 | 23 | 54 | 55 | 2 | 3 | 34 | 35 | 18 | 19 | 50 | 51 |
| 30 | 31 | 62 | 63 | 14 | 15 | 46 | 47 | 26 | 27 | 58 | 59 | 10 | 11 | 42 | 43 |
10C
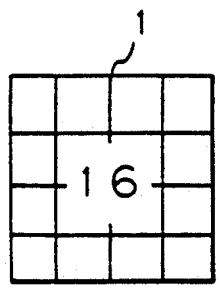  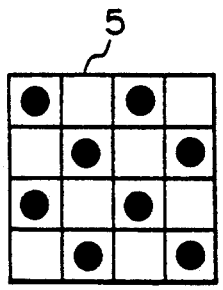
Fig. 8B
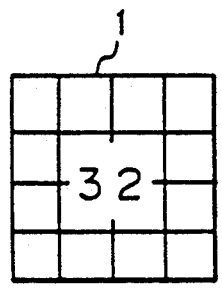  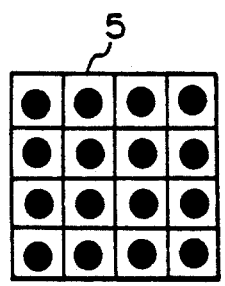
Fig. 8C
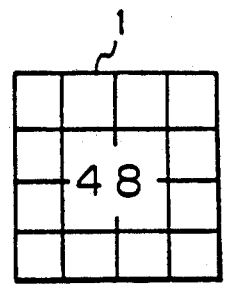  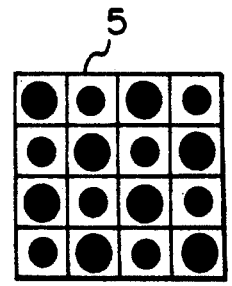
Fig. 8D

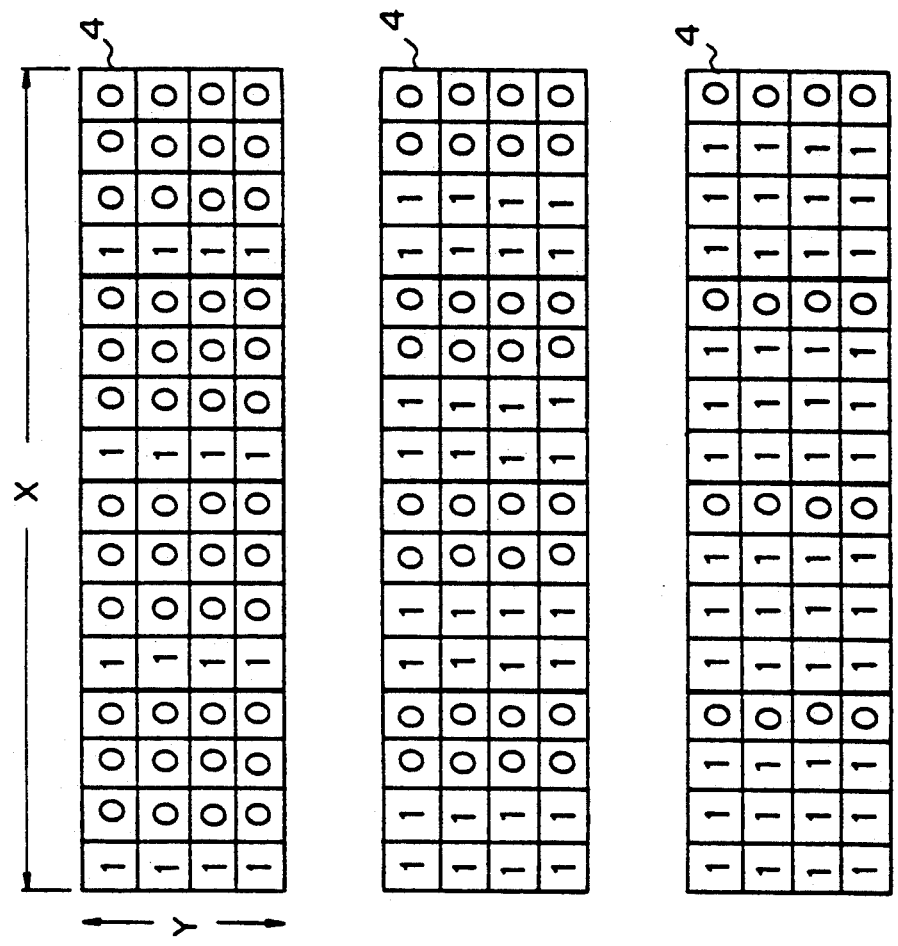

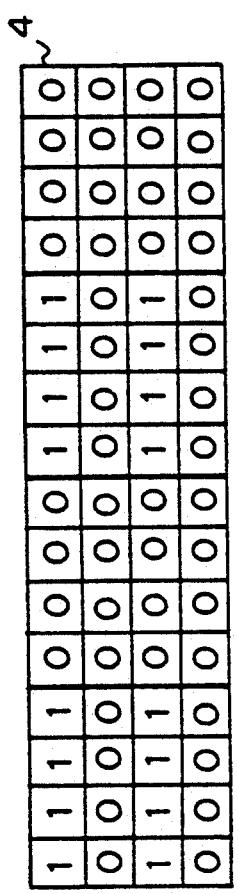 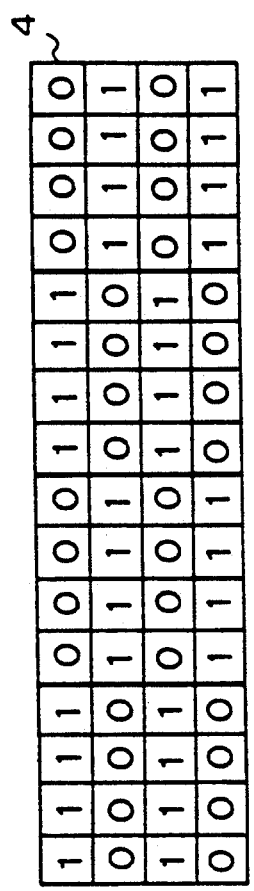 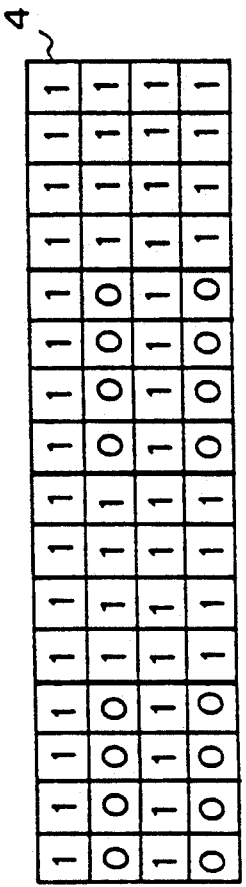
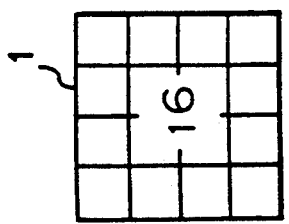
Fig.IIA
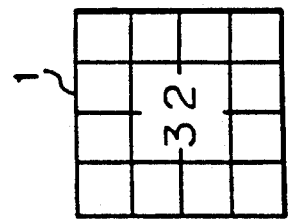
Fig.IIB
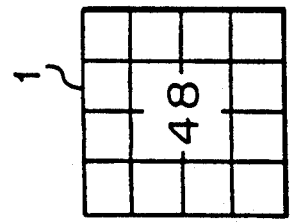
Fig.IIC

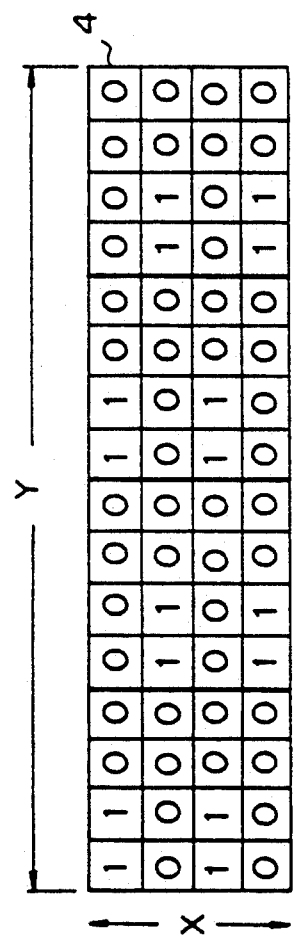
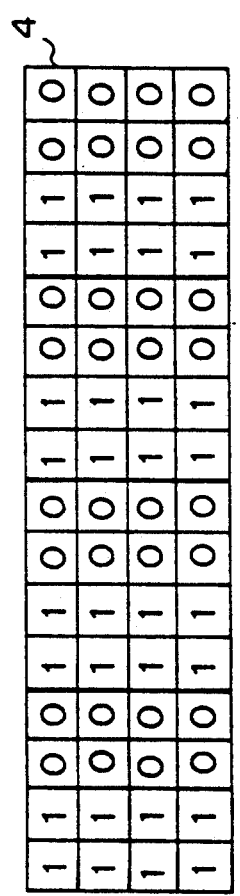
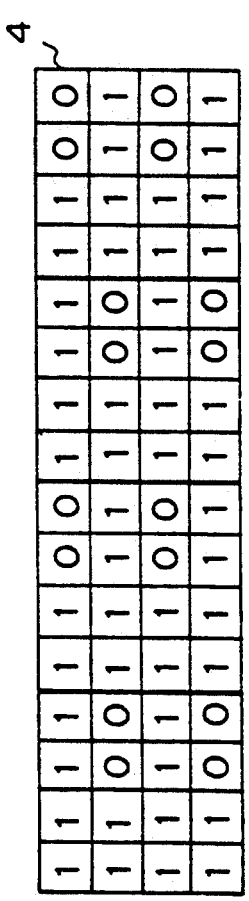
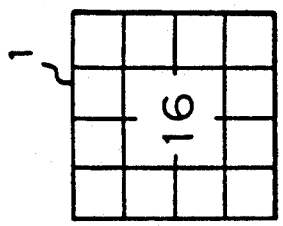
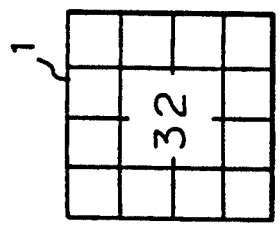
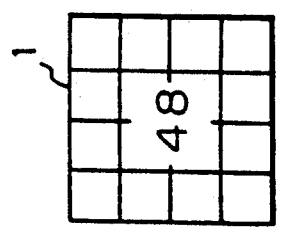
Fig.12A  Fig.12B  Fig.12C

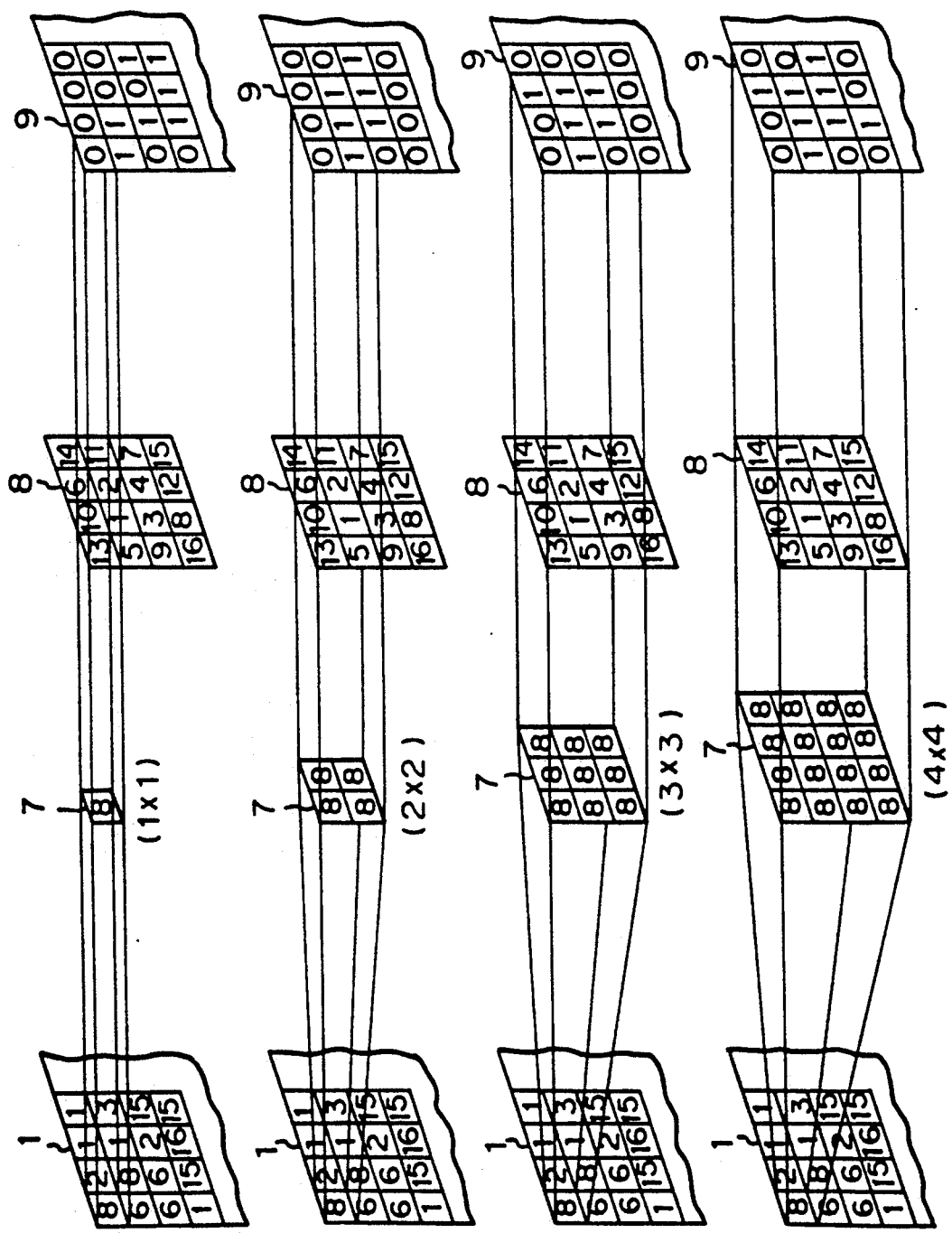

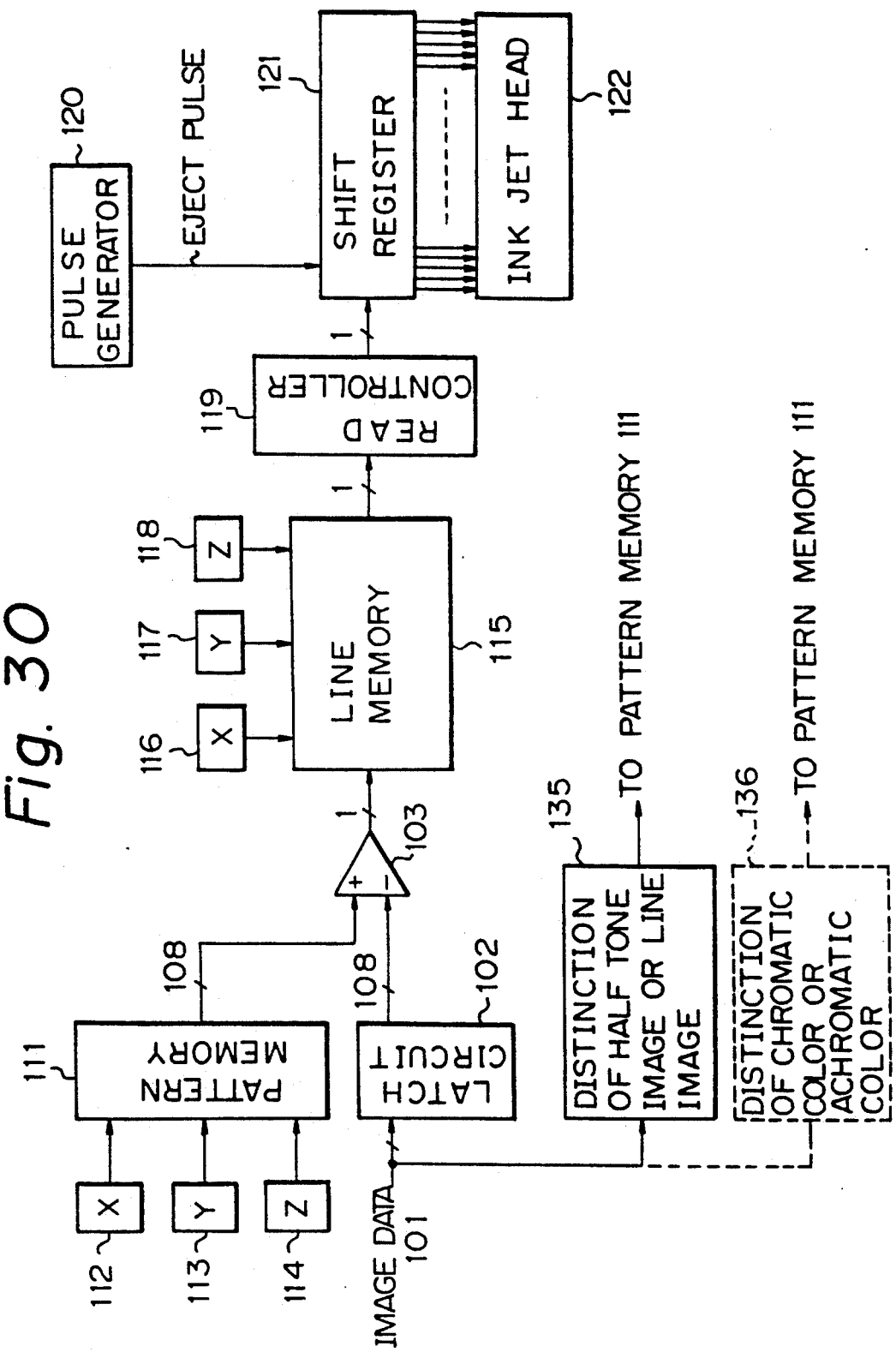

IMAGE PROCESSING METHOD FOR SUPERPOSING PLURAL DOTS ON A RECORDING MEDIUM AT A PREDETERMINED INTERVAL AND APPARATUS UTILIZING SAME

This application is a continuation of application Ser. No. 07/519,323 filed May 7, 1990, now abandoned, which is a continuation of application Ser. No. 07/195,648 filed May 18, 1988, now abandoned.

BACKGROUND OF THE INVENTION

1. Field of the Invention

The present invention relates to an image processing apparatus and, more particularly, to an image processing apparatus suitable for performing an ink jet recording.

2. Related Background Art

As an image processing apparatus for receiving multi-value image data and binarizing, there is known an image processing apparatus in which digital multi-value image data indicative of the concentrations or the like of the pixels which are input from, particularly, a scanner, television camera, or the like is binarized into the binary signals of ON and OFF and these binary signals are output to an ink jet printer.

Hitherto, in such a kind of image processing apparatus, when the image data having what is called depth information such as color images or gradation images which are sent from a host computer or the like is printed by an output device like a line printer or the like such as an ink jet printer, in general, comparison data of a fixed threshold value pattern matrix is accessed from a memory (storage device) and compared with the input image data, thereby binarizing.

Namely, such image data having the depth information is the data in which the gradations of the pixels or the like are represented by digital values as is well known and such image data cannot be directly printed by a line printer of the binary output type or the like. Therefore, the image data must be binarized before it is input to the line printer or the like. For this purpose, as a conventional method of representing the gradations by the line printer or the like, there is known an image processing method whereby a set of a plurality of dots is defined as one pixel and by determining which dots in one pixel are printed or not in accordance with the gradation level of the input image data, thereby outputting and representing the gradation (light or dark concentration of the image). However, when the image is printed by this method, there is a problem such that an unbalance occurs between the printed pixel and the other pixel and a false contour is generated, so that the printing quality deteriorates. To avoid this problem, there is used a system in which another output pattern different from the input pixels is specified and this pattern is compared with the image data having the depth information, thereby properly expressing the gradations with a wide range, that is, a binarization image processing system (including a dither system) based on the threshold value pattern comparison.

FIGS. 13A and 13B show an example of a schematic constitution of the conventional binarization image processing system in which the multi-value image data is compared with the threshold value data matrix (data) and the image is printed on the basis of the resultant binarized image data. According to this conventional system, as a threshold value matrix 2 for multi-value image data 1, for example, a pattern of a matrix of 4×4 as shown in these diagrams is provided. The image data 1 and matrix pattern 2 are compared by a comparator 3 and binarized. The binarized data is stored in a line memory 4. The binarized data is read out of the line memory 4 at timings as shown in FIG. 14 and output as a dot printing 5 by a line printer. In this case, since the threshold value matrix 8 has the pattern of 4×4, seventeen (=16+1) gradations can be expressed by an area gradation method.

By enlarging the size of the threshold value matrix 2, the finer gradations can be obtained. For example, by setting the size of the matrix to 8×8, 65 (=64+1) gradations can be expressed. By setting the size of the matrix to 12×12, the 145 (=144+1) gradations can be expressed.

FIG. 15 shows a conventional example of a circuit to perform the foregoing binarization image process. In the diagram, the input image data 1 is the digital multi-value data which is obtained by the digital values of eight bits or the like. However, since it is printed by an output device such as a dot printer, it is input to one input terminal of the (parallel) comparator 3 through a latch circuit 2. This image data is compared by the comparator 3 with the threshold value matrix data which is read out of a pattern memory 4 and which is input to the other input terminal of the comparator 3, so that it is dot developed into the binarized data of 0 and 1. When the multi-value image data is simply binarized, the gradations cannot be expressed. Therefore, when the input image data 1 is input to the comparator 3, the comparison data (threshold values) are sequentially read out of the pattern memory 4 in which threshold values (threshold value matrices) are written and the image data is compared with this comparison data, so that it is binarized to the values of 1 and 0. For example, in the case of developing one image data 1 into the pixels of 4×4 and binarized, the threshold value data is accessed sixteen times for the one image data 1 and successively compared with the one image data, so that the image data is binarized by the dot development of 4×4.

FIGS. 16A to 16D show the operations of the conventional circuit based on the pixel development methods of 1×1, 2×2, 3×3, and 4×4. The input multi-value image data 1 is developed into the pixels in accordance with the pixel size and compared with threshold value data 8 of 4×4, thereby outputting the binarized concentration pattern onto a printing surface 9. "1" on the printing surface 9 shows that a dot is printed and "0" indicates that no dot is printed. In the diagrams, four kinds of pixel development methods of 1×1 to 4×4 have been shown. However, the size of the pixel is determined depending on a set of which number of ink dots by which the input multi-value image data 1 is expressed. Therefore, as compared with the image which is developed into the pixel of 1×1, the image which is developed into the pixels of 4×4 is printed as the size which is sixteen times as large as the image of 1×1. On the other hand, since the threshold value matrix 8 consists of 4×4 pixels, seventeen (including white) gradations can be expressed by the area gradation method.

FIGS. 17A to 17C show an example of the actual threshold value data of a threshold value matrix 8-1 of 4×4, an example of an ideal printing model which is printed by this threshold value matrix, and an example of the actual threshold value data of a threshold value matrix 8-2 of 8×8. Numerical values 1 to 16 in FIG. 17B represent the numbers of gradations. The threshold value data in FIG. 17C is expressed by the hexadecimal numbers. Although the threshold value matrix 8-2 of 8×8 in FIG. 17C is the threshold value pattern matrix corresponding to the multi-value image data 1 of eight bits, up to 65 (including white) gradations can be expressed.

In other words, according to the conventional image processing system, only 17 gradations are obtained by the matrix area of 4×4 and in order to further increase the number of gradations, the matrix area must be enlarged to the area of, e.g., 8×8 and the fine half tones cannot be expressed. However, the increase in size of the threshold value matrix causes drawbacks such that although the number of gradations increases, the resolution in output printing remarkably deteriorates and the graininess roughness becomes conspicuous. Accordingly, when the image data is the multi-value image data of eight bits, although the concentration levels of 256 gradations are provided, if the binarization is performed to execute the area modulation and the resultant binarized data is printed and output by the foregoing conventional system, in order to prevent the remarkable deterioration in resolution or graininess, for example, the gradation levels are compressed to 17 levels by using the threshold value matrix of 4×4 as mentioned above. In this manner, the half tone must be expressed by fairly sacrificing the gradations.

SUMMARY OF THE INVENTION

It is the first object of the present invention to provide an image processing apparatus which can improve both of the gradation and graininess in consideration of the foregoing drawbacks.

The second object of the invention to provide an image processing apparatus suitable for use in a recording apparatus such as an ink jet recording apparatus which can superpose and record the recording agents onto a recording medium.

Under these objects, according to a preferred embodiment of the present invention, there is provided an image processing apparatus for supplying binary image data to an ink jet recording apparatus for increasing a diameter of a recording dot by superposing flying liquid droplets ejected from a nozzle to the same position on a material to be recorded in accordance with an input of binary image data, wherein a plurality of threshold value matrices which are used when the input multi-value image data is developed into the binary image data are provided in correspondence to the superposing order.

According to this apparatus, since threshold values corresponding to the superpositions are prepared and the superposition is performed by the ink jet printer, for example, in the case of the pixel matrix of 4×4, by superposing four dots, 65 (=64+1) gradations can be expressed although only 17 (=16+1) gradations can be expressed in the conventional apparatus. Thus, the number of gradations can be remarkably increased.

On the other hand, the applicant of the present invention has found out that when the superposition is performed by the ink jet, there is a predetermined relation between the ejection interval of the ink and the diameter of the superposed dot. It is still another object of the invention to provide a recording apparatus in which the gradation and resolution can be improved by using this relation.

Under such an object, according to a preferred embodiment of the invention, there is provided an ink jet recording apparatus in which one pixel is expressed by a set of a plurality of dots whose minimum diameter is smaller than the dot printing pitch and at the same time, a plurality of ink droplets are continuously ejected at the same position on a medium to be recorded by use of a threshold value matrix or concentration pattern data in accordance with the concentration or color tone of an input image, thereby enabling the ejection time interval of the ink droplets to be varied.

The above and other objects and features of the present invention will become apparent from the following detailed description and the appended claims with reference to the accompanying drawings.

BRIEF DESCRIPTION OF THE DRAWINGS

FIG. 1A is a block diagram showing an arrangement of an embodiment of the present invention;

FIGS. 1B and 1C are explanatory diagrams showing the operation of the embodiment of FIG. 1A;

FIG. 2 is a timing chart showing output timings in the embodiment of FIG. 1A;

FIGS. 6, 7 and 8 are explanatory diagrams showing examples of threshold value matrices in the embodiment of the invention and their output states, respectively;

FIGS. 10, 11 and 12 are explanatory diagrams showing the operations in look-up tables in the embodiment of the invention;

FIGS. 16A, 16B, 16C and 16D are diagrams showing the functional relations between the sizes of pixels when input multi-value image data is binarized in the conventional apparatus and the threshold value matrices.

FIG. 30 is a block diagram showing a circuit arrangement of the main section in still another embodiment of the invention.

DETAILED DESCRIPTION OF THE PREFERRED EMBODIMENTS

An embodiment of the present invention will be described in detail hereinbelow with reference to the drawings.

A. Principle of the growth of a dot diameter

According to the present invention, in the ink jet recording system, by changing a dot diameter by the superposition of the dot, the number of gradations is increased without changing a size of threshold value matrix. The growth of the dot diameter by the superposition will be first explained.

Figures 3A, 3B, 3C, 3D:
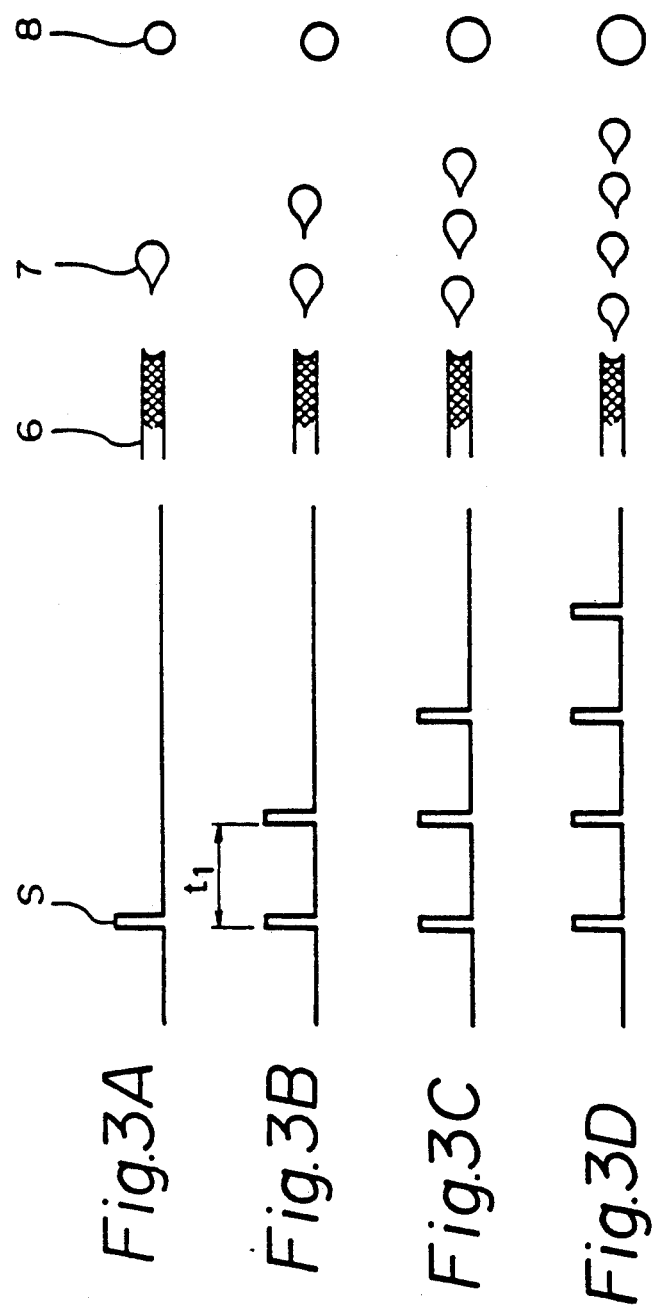
FIGS. 3A, 3B, 3C and 3D are an explanatory diagram showing the relation between dot superposition number and the growth of the dot diameter.

As shown in FIG. 3, when an ejection signal S of an ink jet printer is continuously applied to heat generating elements (not shown) in a nozzle 6, ink droplets 7 as many as the number of pulses of the ejection signal are ejected out of the nozzle 6 and the inks are united and blurred at the same position on a paper surface, so that a diameter of printing dot 8 grows. On the other hand, as the dot diameter increases, the concentration of the printing dot itself shown at 8 also increases, thereby changing the gradation.

FIG. 4 shows the cases where output intervals ($t_2$ and $t_3$) of the first and second dots are widened. When the output interval (time) becomes long, the dot concentration increases. However, the growing degree of the dot diameter is slow because after the ink droplet of the preceding dot has sufficiently permeated a recording paper, the ink droplet of the next dot is ejected, so that the size of the dot diameter is small.

Figure 5:
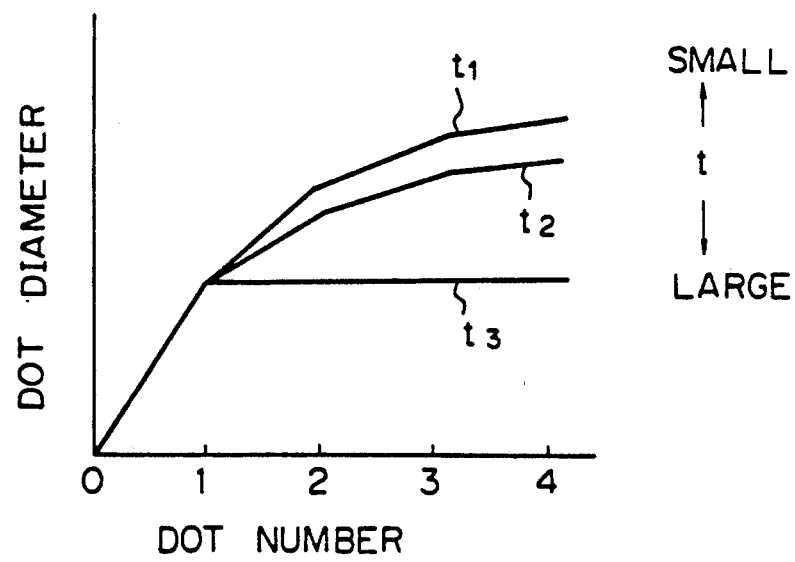
FIG. 5 is a characteristic graph showing dot diameter growing characteristics in the embodiment of the invention.

FIG. 5 shows the relationship among the number of output dots to be superposed, the dot diameter, and the time interval of the output dots.

In an embodiment of the invention, which will be explained hereinlater, the foregoing characteristic of the growth of the dot diameter and the dot superposition number is used and the data of a threshold value matrix is changed in correspondence to the superposing order, thereby enabling the smoother gradation to be expressed. In FIGS. 3A to 3D, the example of the superposition of four dots has been shown. However, if an ink droplet of a small dot can be ejected by improving the performance of the nozzle 6 and up to eight dots can be superposed, 129 ($=4\times4\times8+1$) gradations can be obtained and the finer gradations can be expressed without changing the size (output area) of the threshold value matrix as compared with the 4-dot superposition which enables 65 ($=4\times4\times4+1$) gradations to be derived.

On the other hand, if the pattern size of the threshold value matrix is widened to $8\times8$, even in the case of the 4-dot superposition, 257 ($=8\times8\times4+1$) gradations can be expressed and the whole area of the input image data can be covered.

B. Circuit arrangement of the embodiment

Figure 1C:
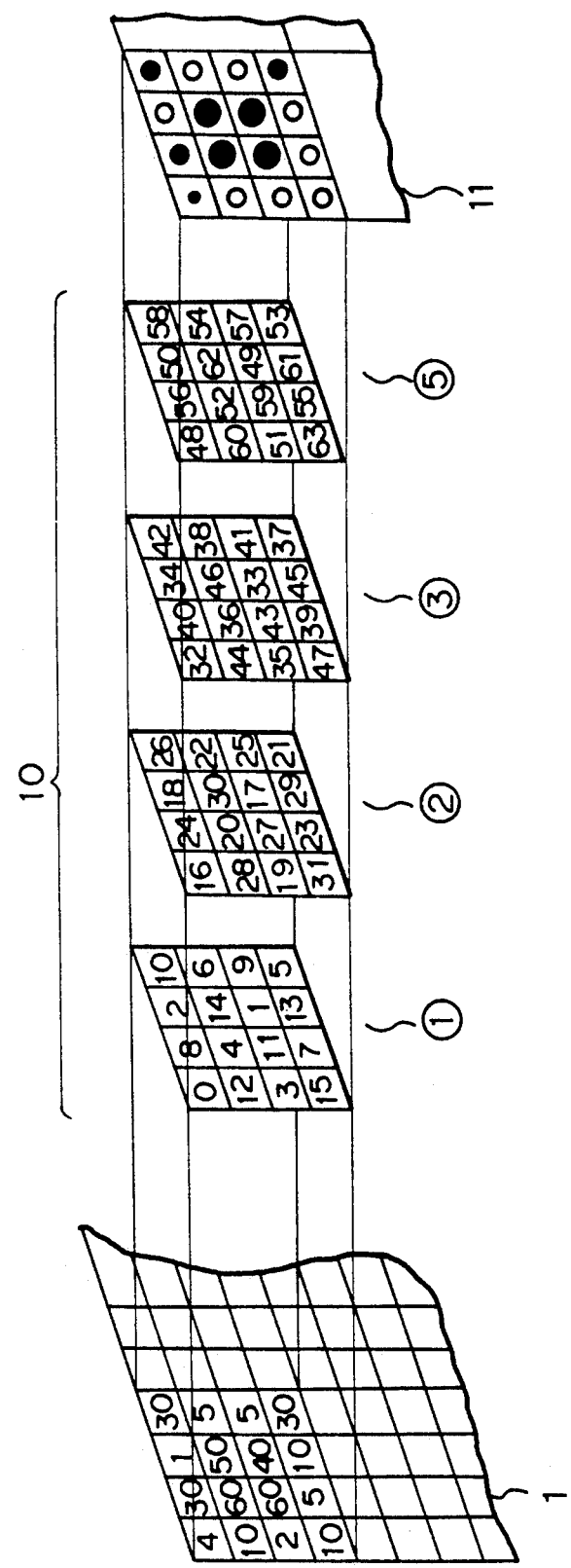

FIG. 1A shows an example of a schematic arrangement of an image processing apparatus of an ink jet printer to which the invention is applied. FIGS. 1B and 1C show examples of the operation of this apparatus. Reference numeral 10 in FIG. 1A denotes a pattern memory in which a plurality of threshold value matrices as shown in FIGS. 1B and 1C are previously stored. A plurality of threshold value matrices as shown in FIGS. 1B and 1C are prepared in the pattern memory 10 in accordance with the superposing order.

Although the image data 1 which is input to the comparator 3 is the digital multi-value data of eight bits, it is binarized into the data of 0 and 1 by the comparator 3 in order to print by the ink jet printer. However, if the input image data 1 is simply binarized as in the conventional apparatus, the gradation of each dot cannot be expressed. Therefore, the input image data is compared with a plurality of threshold value matrices and binarized every superposition as will be explained hereinafter. This process is referred to as a dot development hereinafter.

On the other hand, the line memory 4 has the memory capacity as much as the number of ejecting ports of the nozzle 6. In this embodiment, the nozzle 6 consists of four ejecting ports 6-1 to 6-4 arranged in the vertical direction. Therefore, the line memory 4 has the memory capacity of four bits in correspondence to the nozzle 6.

When the image data 1 is input to the comparator 3, the comparison data (threshold values) are sequentially output to the comparator 3 from the pattern memory 10 in which the foregoing threshold values are written. The image data 1 is binarized into the print data (ejection signals) S of 0 and 1 by the comparator 3. When the data binarized by the comparator 3 is stored into the line memory 4 by the amount of four pixels, it is recorded by the nozzle 6. In the case where the image data 1 is made correspond to the dot matrix of $4\times4$, the threshold value data is accessed sixteen times for one of the four superpositions with respect to one input image data 1 and binarized.

Assuming that the image data 1 was input as the level "32", it is first compared with the threshold value matrix ○1 of $4\times4$ among the threshold values stored in the pattern memory 10 shown in FIG. 1B by the comparator 3 and binarized. The binarized data is written into the line memory 4. This data is read out of the line memory 4 as the ejection signal S and applied to the heat generating elements of the nozzle 6 and printed. The line memory 4 has the memory capacity as shown in FIG. 2. The data read out of this memory is sent to each heat generating element of the nozzle 6 at timings as shown in data $S_1$ in FIG. 2. The data transmitted at the timing $S_1$ is actually printed at a timing of $S_2$. Next, after the ink droplet was superposed a predetermined number of times (four times in this embodiment), a carriage of a printing head or a recording paper (not shown) is moved at a timing shown by a pulse $S_3$ in FIG. 4.

C. Example of constitution of pattern memory

The content of the pattern memory 10 will now be described further in detail with reference to FIGS. 1B and 1C. In order to superpose the ink, 4×4×4 matrices including the superposing direction are prepared in the pattern memory 10 so that four threshold values are output for the pixel in the same address. These matrices are compared with the multi-value image data 1 by the comparator 3. In order to also prepare the data of the superposing direction, in the case of the 4-dot superposition, the threshold value pattern matrix has four conventional threshold values of 4×4 as shown at ◯1 to ◯4 for the superposition of four times, so that the threshold value pattern matrix has the memory size which is four times as large as that of the conventional one. Accordingly, the number of comparison times with the image data is also four times as large as the conventional one.

The output data binarized to 0 and 1 by the comparator 3 in accordance with the superposing pattern design is input to the line memory 4 as mentioned above and converted into the ejection signal S of the ink jet. In FIG. 1B, numerals shown in the first row, for example, indicate energies which are applied to the ejecting ports 6-1 to 6-4 while the nozzle 6 is stopped at the first row position. For instance, the data of "1100" is given to the ejecting port 6-1 and this means that two dots are superposed.

D. Output timing

As shown in FIG. 2, for example, in the case of the 4-dot superposition, the data transfer pulse $S_1$ and the output of the ejection pulse $S_2$ in the embodiment are performed four times before a travel pulse $S_3$ is input, respectively. The number of superpositions is determined by the number of data transfer pulses $S_1$ and the number of ejection pulses $S_3$ which are input between the travel pulses $S_3$ which are supplied to the carriage or paper feed motor.

As the interval between the travel pulses $S_3$ is long, many dots are printed to the same position on the paper. As this interval is short, the dots are printed at the deviated positions on the paper. Therefore, the period of the travel pulses $S_3$ is also a significant factor in the growth of the dot diameter.

On the other hand, there is a tendency such that as the number of ejection dots which are printed at the same position is large, the united ink shape approaches a circle, while as the ejection dots are printed to the deviated positions, the united ink shape becomes an ellipse. Further, there is also a tendency such that when the generating interval of the ejection pulses $S_2$ is set to $t_1$ and the generating interval of the travel pulses $S_3$ is set to $t_2$, if the relation of $t_1 \times$ the number of superpositions $< t_2$ is satisfied, the ejection dots are printed to the same position and the united ink shape becomes a circle and the gradations on the growth of the dot diameter can be easily obtained.

Figures 4A, 4B, 4C:
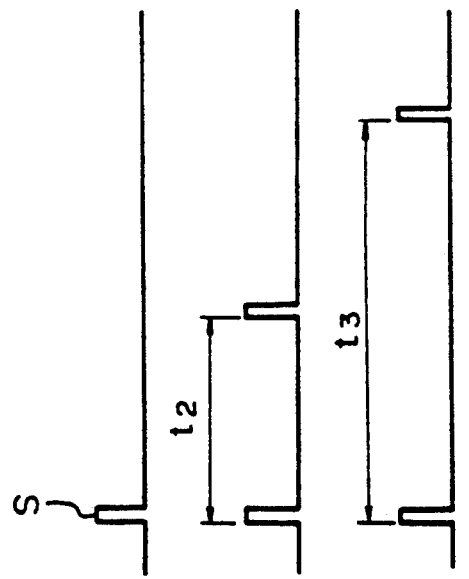
FIGS. 4A, 4B and 4C are an explanatory diagram showing the relation between the superposing time interval and the growth of the dot diameter in the embodiment of the invention.

The explanation has been made with respect to the case where the output data of the line memory 4 for the ejection port 6-1 is "1100" and, consequently, two dots are superposed. However, when the output data is "1111", four dots are superposed. In the case of "1110", three dots are superposed. On the other hand, it is also possible to superpose the first and second dots with a time interval held therebetween by setting the output data to "1001". In this case, as shown in FIGS. 4C and 5, the dot diameter slowly grows and only the concentration by the superposition is improved.

E. Kinds of threshold value matrices

FIGS. 6 to 8 show examples of kinds of threshold value matrices which are stored into the pattern memory 10. First, a threshold value matrix 10A shown in FIG. 6A is a dispersive type threshold value matrix similar to that shown in FIG. 1B. As shown in FIGS. 6B to 6D, when the given image data represents sixteen levels, the first dot is printed to the whole area. In the case of 32 levels, the second dot is superposed. In the case of the 48 levels, the third and fourth dots are superposed. In this manner, the dots are averagely superposed.

A threshold value matrix 10B shown in FIG. 7A is a concentrated type threshold value matrix. As shown in FIGS. 7B to 7D, the dots are concentratedly printed to the same position, so that the size of the united ink shape is gradually widened.

A threshold value matrix 10C shown in FIG. 8A is an irregular concentrated type threshold value matrix similar to that shown in FIG. 1C. As shown in FIGS. 8B to 8D, after two dots were superposed, the printing position is changed and the superposing area is widened. In this manner, a superposed pattern is derived.

As mentioned above, by changing the superposing order, the gradations can be controlled. By changing the content of the threshold value pattern, the fine gradations in consideration of [dither+dot diameter growth+change in concentration of the superposition] can be derived.

F. Embodiment by look-up table system

Figure 9:
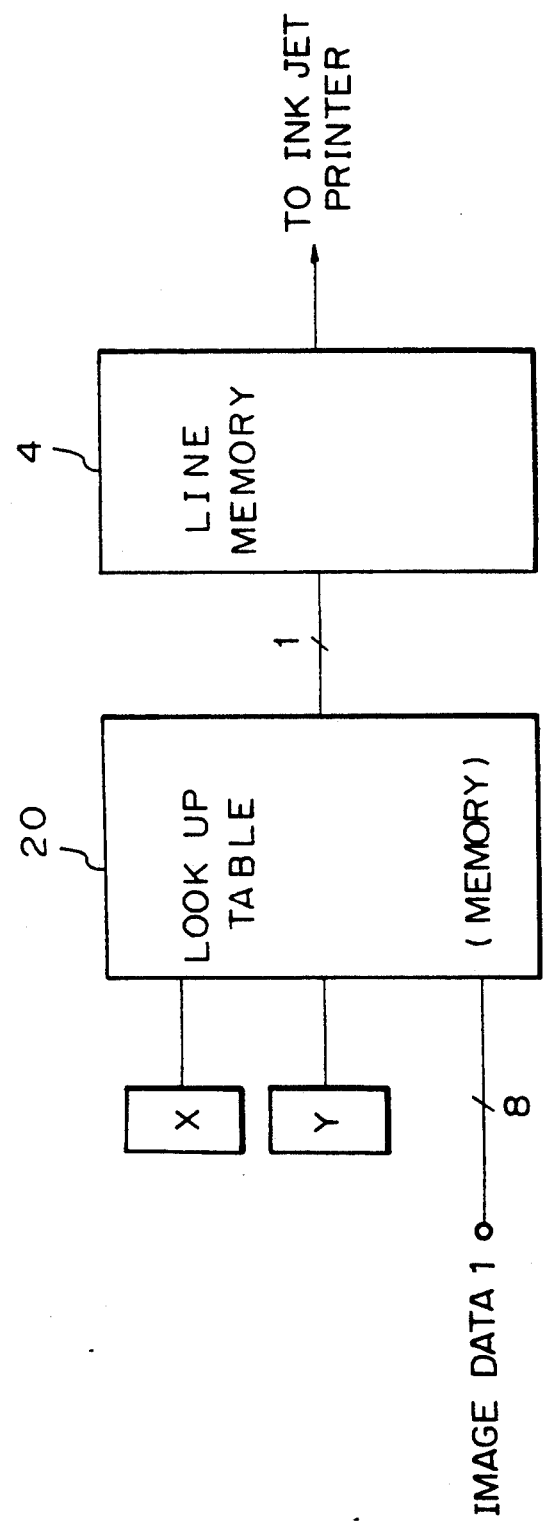
FIG. 9 is a block diagram showing an arrangement of another embodiment of the invention.
Figure 13A:
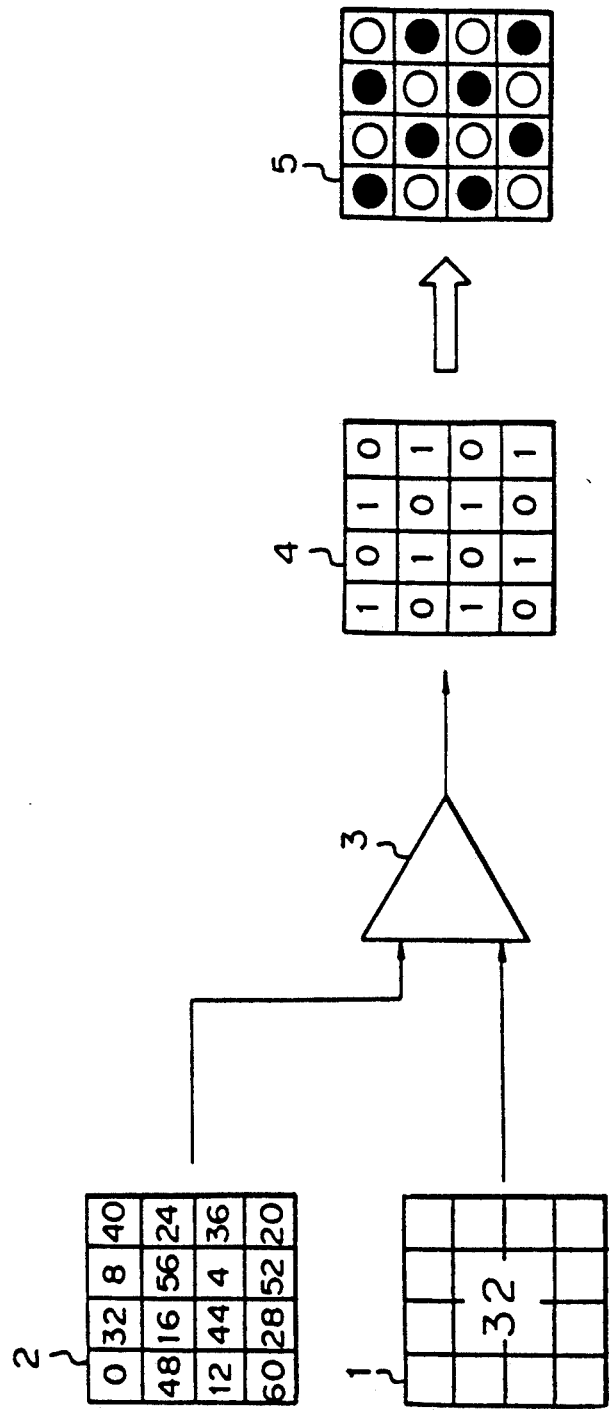
FIG. 13A is a constitutional diagram showing an example of a schematic constitution in a conventional apparatus.
Figure 13B:
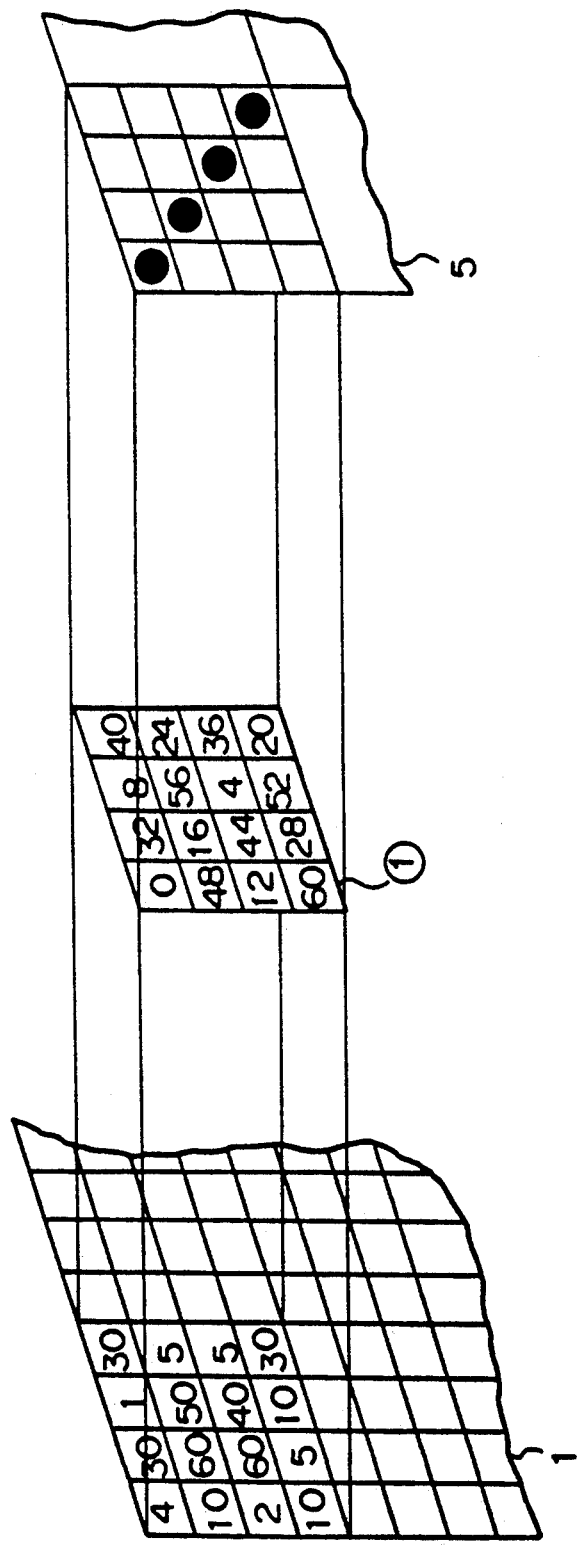
FIG. 13B is an explanatory diagram showing the operation of the conventional apparatus.
Figure 14:
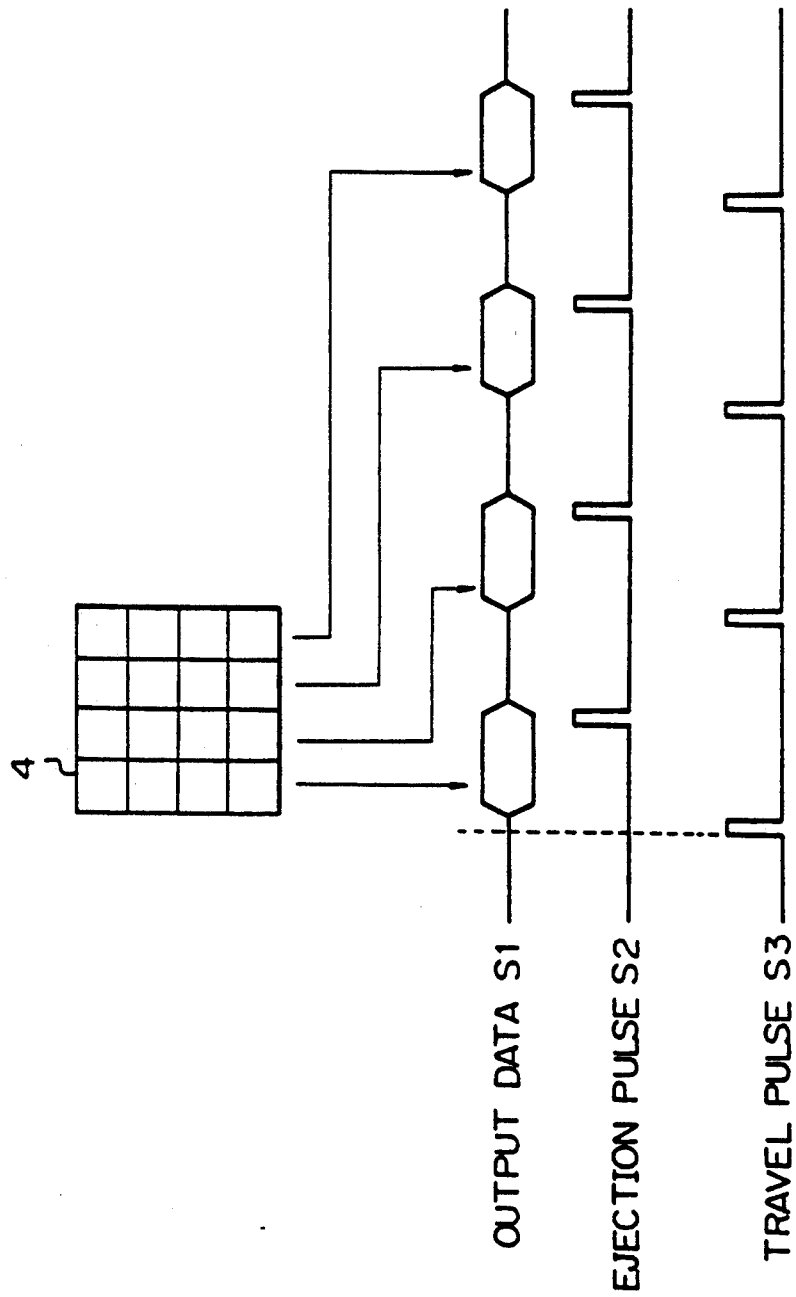
FIG. 14 is a timing chart showing output timings for the conventional apparatus.
Figure 15:
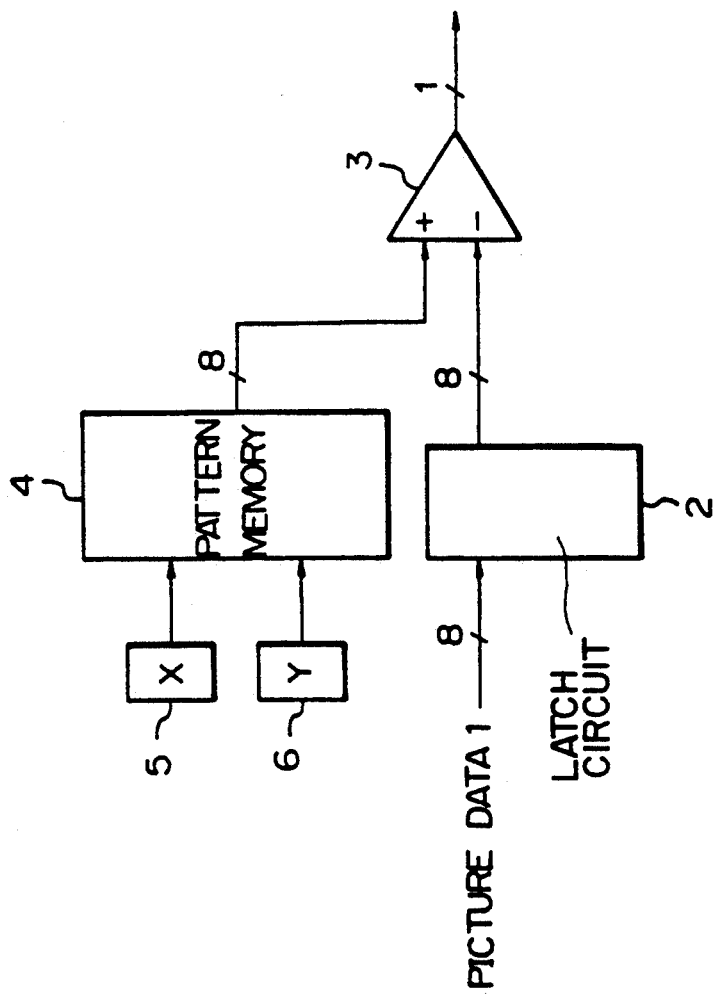
FIG. 15 is a block diagram showing a circuit arrangement of the conventional apparatus.

FIG. 9 shows an arrangement of another embodiment of the invention. In this embodiment, for the input image data 1, the binarization data is accessed from a look up table 20 stored in an ROM (read only memory) together with addresses indicated by X and Y. The accessed binarization data is sent to the line memory 4 and printed by the ink jet printer. Namely, the comparator as shown in FIG. 1 is unnecessary. For example, as shown in FIGS. 10 to 12, the look-up table 20 has the contents to sequentially output the data as shown in the diagrams for input addresses "16", "32", and "48" functions in a manner similar to the threshold value matrices shown in FIGS. 6 to 8. That is, by accessing the input image data 1 and the data in the address shown by X and Y from the look-up table 20, the superposing data similar to those shown in FIGS. 6 to 8 are sent to the line memory 4. In this case, X denotes an address indicative of the number of superpositions and the printing position. Each time the value of X increases by four, the nozzle is moved.

FIG. 10 shows the case of the dispersive type look-up table. FIG. 11 shows the case of the concentrated type look-up table. FIG. 12 shows the case of the irregular concentrated type look-up table.

In this embodiment, by rewriting the content of the look-up table 20, the output pulse design can be easily changed and the effects similar to the first embodiment can be obtained.

As described above, according to the embodiment, the following effects are derived.

(1) The threshold values corresponding to the superposition are prepared and the dots are superposed by the ink jet printer. Therefore, for example, in the case of the pixel matrix of 4×4, only 17 (=16+1) gradations can be expressed in the conventional apparatus, but 65 (=64+1) gradations can be expressed for the 4-dot superposition and the number of gradations can be fairly increased according to the embodiment.

(2) Further, by changing the superposing interval, only the concentration can be increased by superposing the dots without growing the dot diameter, so that the smooth gradations can be obtained as a whole.

(3) On the other hand, by reducing the dot diameter, the growth of the dot diameter can be enhanced, so that the finer gradations can be derived.

(4) For the number of superpositions, by realizing the 12-dot superposition, the high grade gradations such as 192 (=4×4×12) gradations can be derived, so that the number of gradations can be raised without deteriorating the resolution.

(5) Since the existing ink jet head can be directly easily improved to the head for superposition of the invention, the relatively cheap image processing apparatus of the invention can be easily realized.

Figure 18:
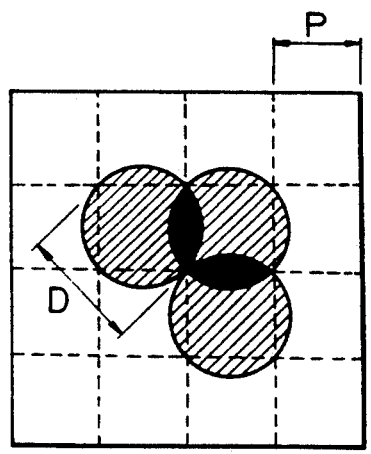
FIG. 18 is a plan view showing the superposition in the actual printing.

In the ink jet recording system for printing dots by using the binarization image processing system, in general, in the case of the painting-out mode, a dot diameter D of the printing dot is set to be larger than a dot pitch P as shown in FIG. 18 so that the paper in the space which is formed among dots cannot be seen. That is, the ink jet apparatus which can obtain the printing dots each of which is larger than the circumscribed circle of the square of the dot pitch is used. On the other hand, in the case of performing the multi-color printing by use of the color inks of yellow, magenta, cyan, and black, a method of obtaining a mixed color by superposing the ink droplets is used. In this case, the printing dot is set to a large value so as to mutually overlap the printing dots as large as possible.

Figure 19:
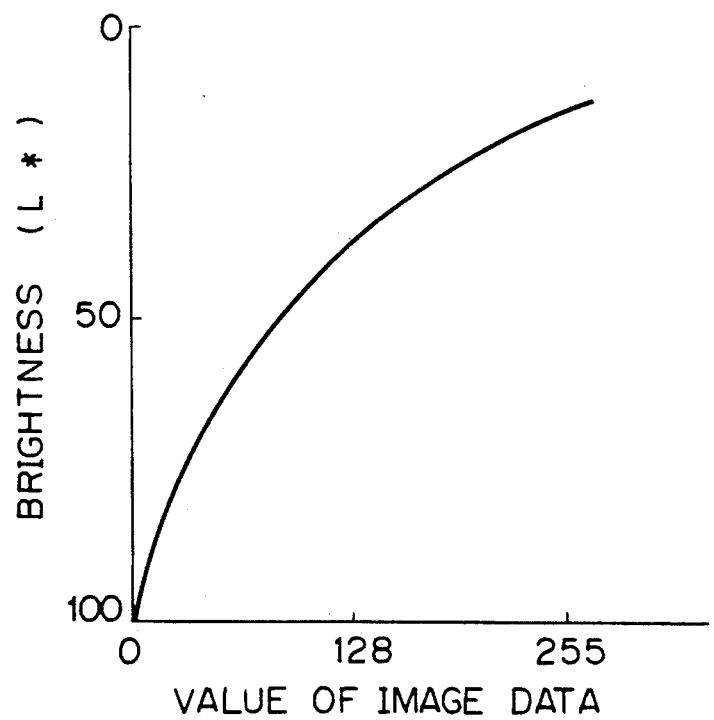
FIG. 19 is a characteristic graph showing the relation between the value of input image data and the brightness ($L^*$)

Therefore, the relation between the input multi-value image data obtained in this manner and the brightness (L*) of a conventional printed matter is not linear as shown in FIG. 19. When the concentration of the image data increases to a predetermined value or more, the brightness is saturated, so that there is a problem such that the input image data cannot be reproduced with a high fidelity.

This problem is serious when the images are reproduced. This point will now be explained with reference to FIG. 20.

Figure 20:
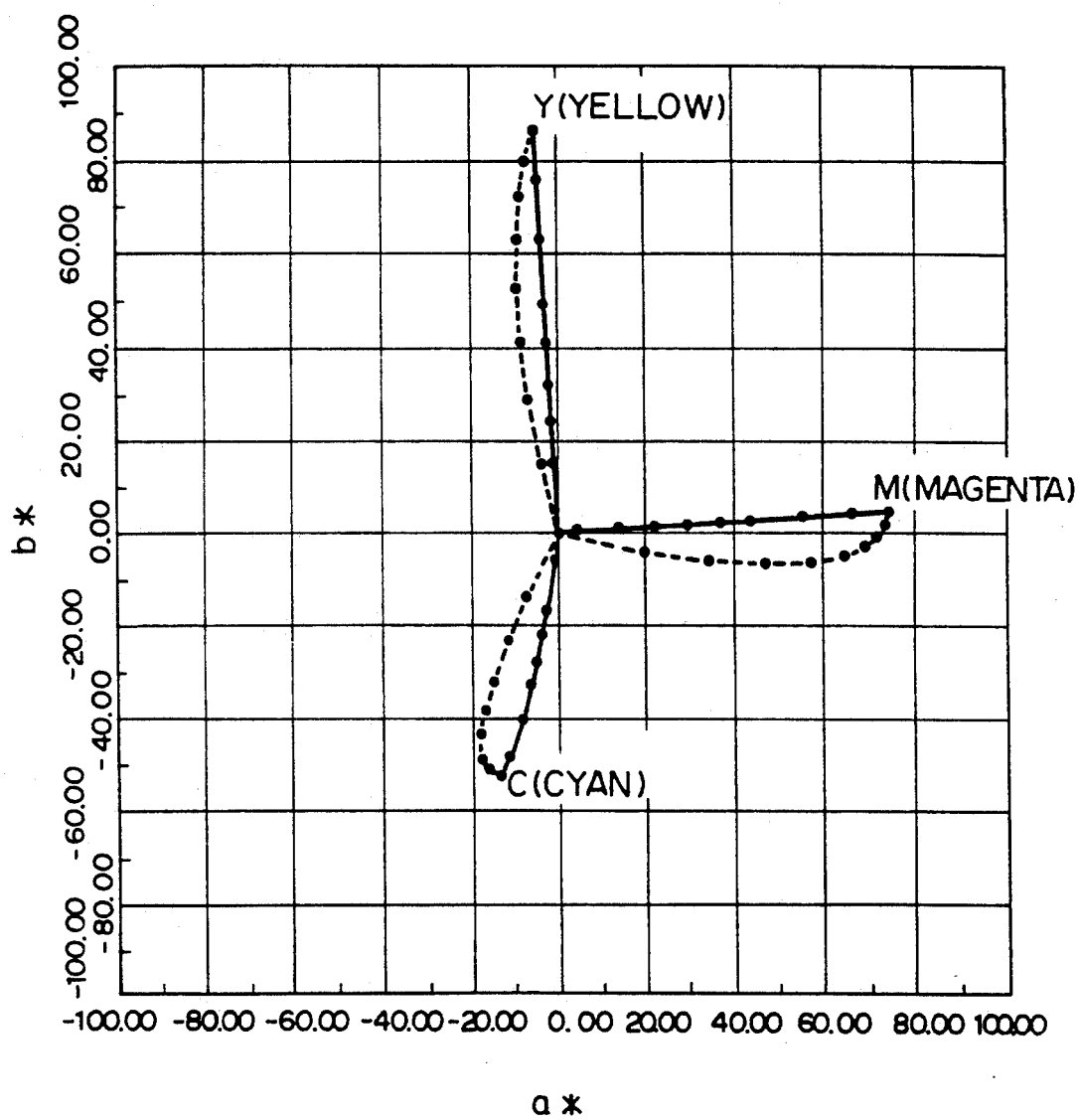
FIG. 20 is a characteristic graph showing the characteristics in the cases where the inks of yellow, magenta, and cyan are superposed on a $a^*-b^*$ plane and where they are not superposed.

FIG. 20 shows the characteristics of the single-color inks of yellow, magenta, and cyan on the a*-b* plane (wherein, +a* denotes the direction of red, −a* indicates the direction of green, +b* represents the direction of yellow, and −b* shows the direction of blue). A broken line in FIG. 20 shows the values of the measurement of a sample which was printed by the actual ink jet recording apparatus in the case where the inks overlap. A solid line shows the ideal values in the case where no ink overlaps. As shown in FIG. 20, in spite of the fact that the printing characteristics are inherently linear, the actual printing characteristics draw a curve. Namely, the actually printed image differs from the inherent image to be printed. This is because the overlap portions of the printing dots as shown in FIG. 18 exist. There is a problem such that even if the dots are printed by using the inks of the same concentration, the color tones in the thin concentration portion, middle concentration portion, and thick concentration portion differ. In other words, the reason why the colors differ even when the same ink is used is because the saturation and hue changes in dependence on the overlap of the inks.

In brief, in the apparatus which has conventionally been considered has the following problems.

(1) Since the dots whose diameters are larger than the dot pitch are printed, the linear relation between the image data and the printing brightness or concentration cannot be obtained.

(2) Even in the case of the same color, the color varies due to the overlap of the dots.

(3) The reference color tone such as saturation or hue indicative of the color cannot be accurately controlled.

(4) Since the size of the threshold value pattern matrix is set to a large value to increase the gradations, there are drawbacks such that the resolution deteriorates and the graininess becomes conspicuous.

An explanation will now be made with respect to an embodiment of an ink jet recording apparatus in which the number of gradations can be increased without changing the size of pixel and the color image quality such as saturation can be accurately controlled.

In the following embodiment, there is disclosed an embodiment in which one pixel is expressed by a set of a plurality of dots whose minimum diameter is smaller than the dot printing pitch, a plurality of dots of the ink droplets are continuously ejected to the same position on a medium to be recorded in accordance with the concentration and color tone of the input image by using the threshold value matrix or concentration pattern data, and the ejection time interval of the ink droplets can be varied.

Figure 21:
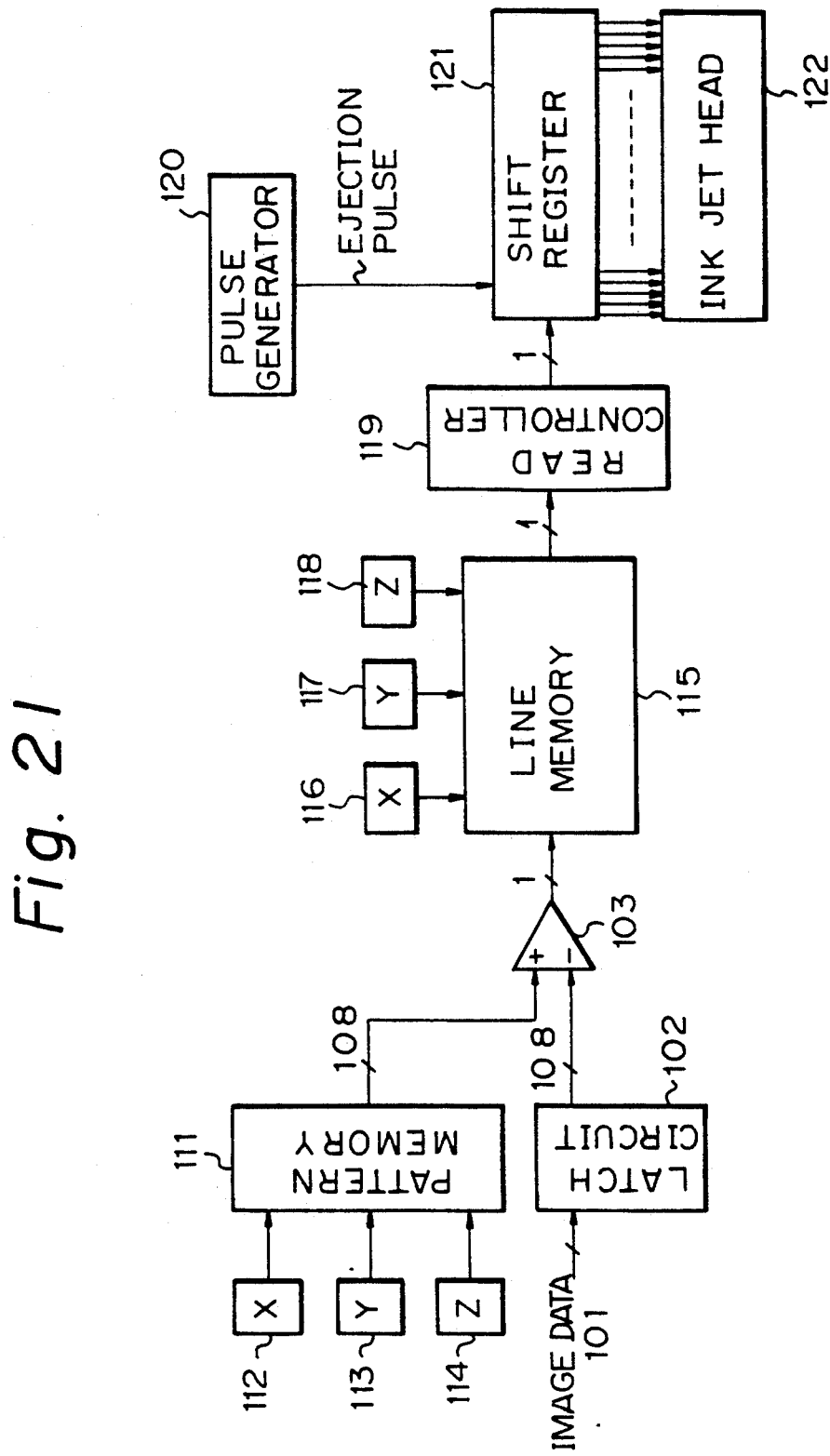
FIG. 21 is a block diagram showing a circuit arrangement of another embodiment of the invention.
Figure 22:
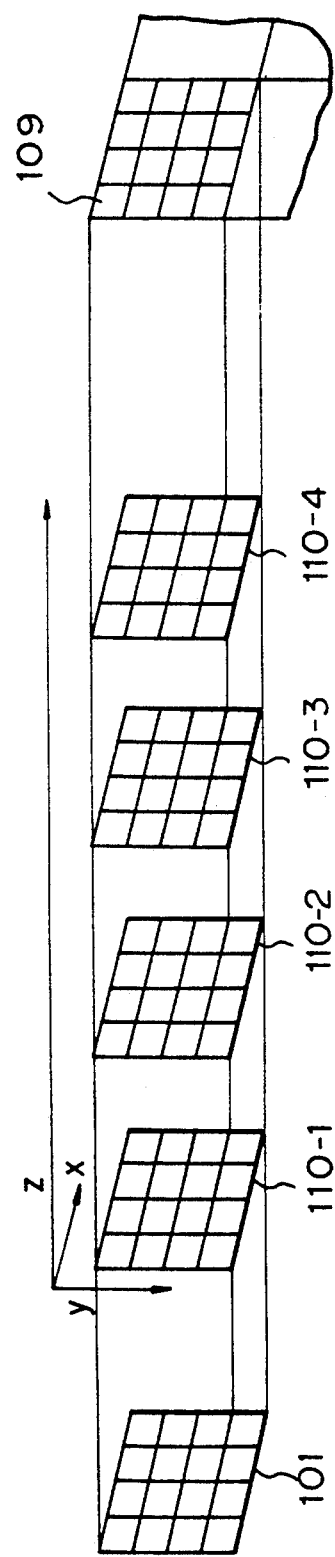
FIG. 22 is a diagram showing examples of constitutions of threshold value matrices stored in a pattern memory in FIG. 21.

FIG. 21 shows a circuit arrangement of the embodiment of the invention. In the diagram, reference numeral 111 denotes a pattern memory in which a plurality of threshold value matrices 10-1 to 10-4 as shown in FIG. 22 are previously stored. Numerals 112, 113, and 114 denote address generators to read out the threshold values in the X, Y, and Z directions, respectively; 115 indicates a line memory to temporarily store the binarization data which was dot developed in a comparator (parallel comparator) 103; 116, 117, and 118 address generators to write the threshold values in the X, Y, and Z directions; 119 a read controller to control the read timing for the output data from the line memory 115; 120 a pulse generator to generate ejection pulses; and 121 a shift register. The data read out of the line memory 115 is supplied to the shift register 121 through the read controller 119 and transmitted to drive elements such as heat generating elements in the nozzle of an ink jet head 122 in response to the ejection pulses of the pulse generator 120.

Figures 17A, 17B, 17C:
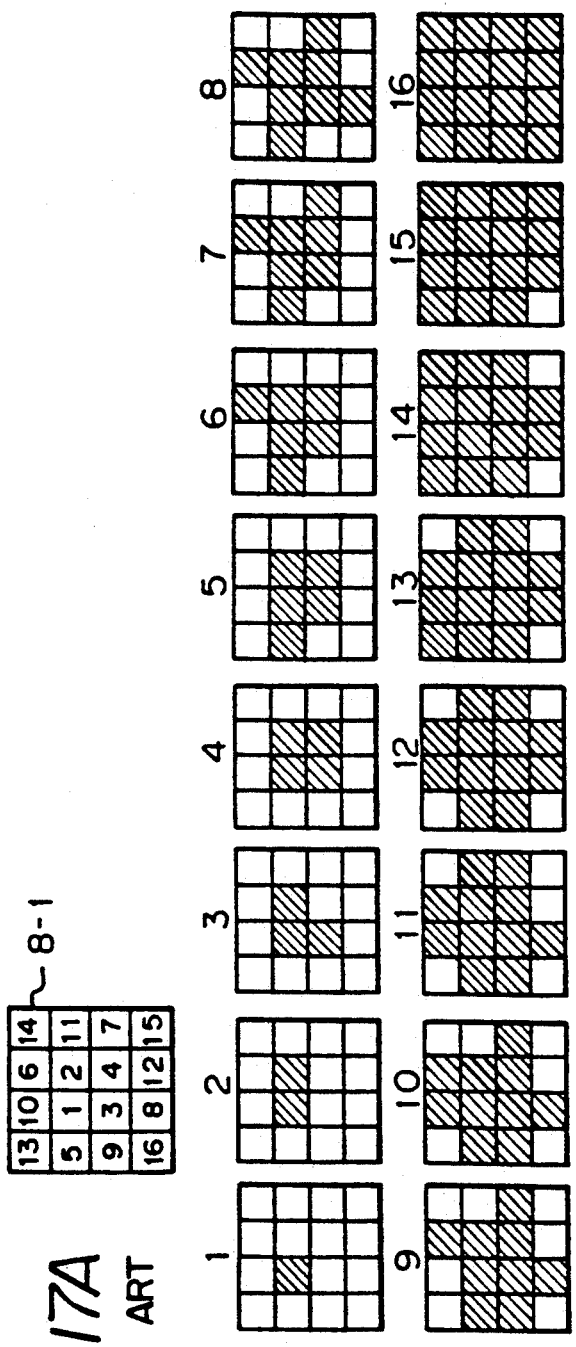
FIGS. 17A, 17B and 17C are explanatory diagrams showing examples of constitutions of conventional threshold matrices and ideal print patterns when printing by using these threshold value matrices.

The conventional threshold value matrices relate to only the x-y directions in the row and column directions as shown in FIGS. 16 and 17. However, in this embodiment, in a manner similar to the foregoing embodiment, the elements are further increased in the Z direction as a superposing direction as shown in FIG. 22. For example, in the case of the 4-dot superposition based on the threshold value matrix of 4×4, the threshold value matrices 10-1 to 10-4 of 4×4×4 are prepared in the pattern memory 111 and sent to the comparator 103 and compared with an input image data 101. As mentioned above, in the case of the threshold value matrices 110-1 to 110-4 in the embodiment, the threshold value data in the superposing direction (Z) is also prepared Therefore, in the case of the 4-dot superposition, the size is four times as large as the conventional 4×4 threshold value matrix. On the other hand, the number of comparison times with the input image data 101 is also four times as large as the conventional one.

The image data binarized into the codes of 0 and 1 in accordance with the superposing pattern data of the threshold value matrices 110-1 to 110-4 is input to the line memory 115 and used as the ejection signal $S_1$ (refer to FIG. 23) of the ink jet printer. For example, if the data binarized by the comparator 103 is given as "1100" to one nozzle 123 (refer to FIG. 23) of the ink jet head 122, the ink droplets are continuously ejected out like the first and second dots. In this manner, the superposing printing is executed to the same position on the paper.

The operation of the embodiment of the invention shown in FIG. 21 will now be explained.

When the input multi-value image data 101 is latched into a latch circuit or supply 102, the threshold value data in the addresses of X, Y, and Z designated by the address generators 112 to 114 is read out of the pattern memory or discriminating 111 and supplied to the comparator 103. The image data 101 supplied from the latch circuit 102 is sequentially compared with the threshold value data by the comparator or developing means 103 and binarized. The data binarized into 0 and 1 by the comparator 103 is stored into the addresses of X, Y, and Z in the line memory 115 in a manner similar to the pattern memory.

Figure 24:
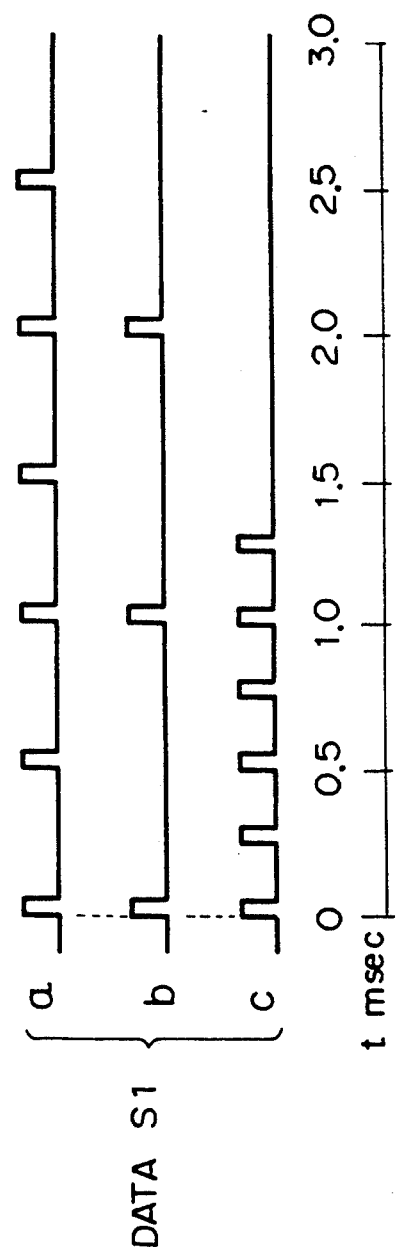
FIG. 24 is a timing chart showing an example of an ink ejection interval in the embodiment.

On the other hand, on the ink jet printer side, the data (ejection signal) prepared in the line memory 115 is read out by the read controller 119 and transmitted to the ink jet head or depositing means 122 through the shift register 121. That is, when the data for the ink jet head 122 is prepared in the shift register 121, the ejection pulse $S_2$ is applied from the pulse generator or control means 120 to the shift register 121. The ejection signal (data) is supplied to the heat generating elements in the nozzle 123 of the ink jet head 122 from the shift register 121 at timings as shown in FIG. 24. The nozzle 123 ejects out the ink in accordance with the ejection signal. The similar operation is again repeated.

To control the dot printing time interval in the circuit constitution of FIG. 21, a plurality of threshold value patterns are prepared as shown in FIG. 22 and this time interval is adjusted by the codes of 1 and 0. For example, assuming that when the data of "32" in the image data 101 is input, the threshold values which are output every superposition are "7", "14", "21", "28", "35", "42", "49", and "56", the image data 101 is binarized into "11110000" for one nozzle. However, assuming that the threshold values are "7", "35", "14", "42", "21", "49", "28", and "56", the image data 101 of "32" is set to "10101010". Although the results of the print in both cases are such that since the ink ejecting (time) intervals differ although they are set to the same 3-dot superposing mode, the diameters of the printing dots differ.

Figure 23:
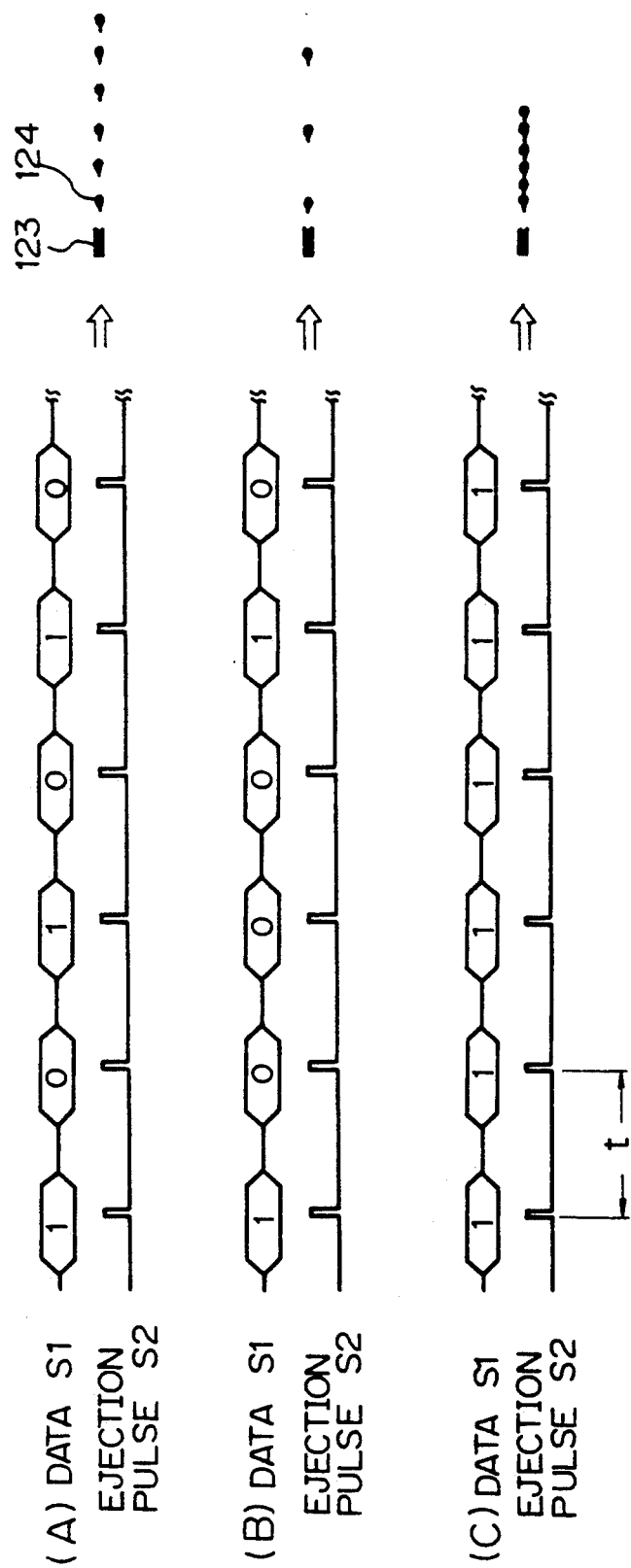
FIG. 23 is a timing chart showing the relation between the ejection data and the ejection pulses in the embodiment.
Figure 25:
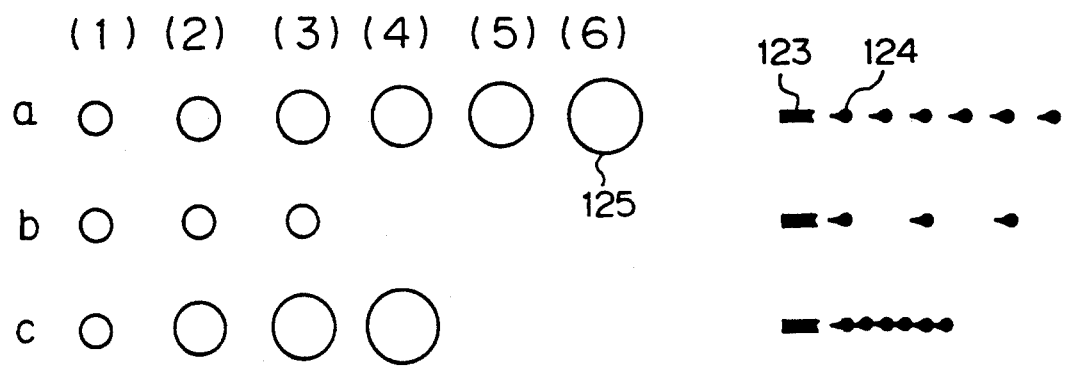
FIG. 25 is a plan view showing the relation between the ink ejection interval and the growth of the dot diameter in the embodiment.

FIGS. 23 and 24 show output timings for the print data $S_1$ and ejection pulse $S_2$ in the embodiment. When the ejection pulse $S_2$ is applied to the data $S_1$ prepared in the shift register 121, only when the data $S_1$ is set to "1", an ink droplet 124 is ejected from the nozzle 123. The ink ejecting interval is shown at t. As shown in FIG. 25, there is a tendency such that as the interval t is short, the dot diameter growing rate of a printing dot 125 increases as a whole, on the contrary, when the interval t becomes long, the dot diameter growing rate decreases.

Figure 26:
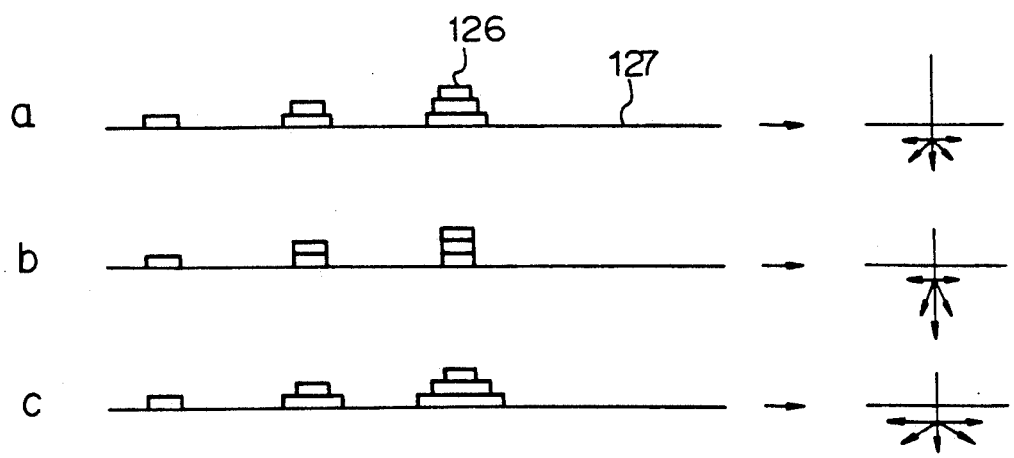
FIG. 26 is a side elevation diagram showing states of deposition of inks due to the difference in ink ejection interval in the embodiment.
Figure 27:
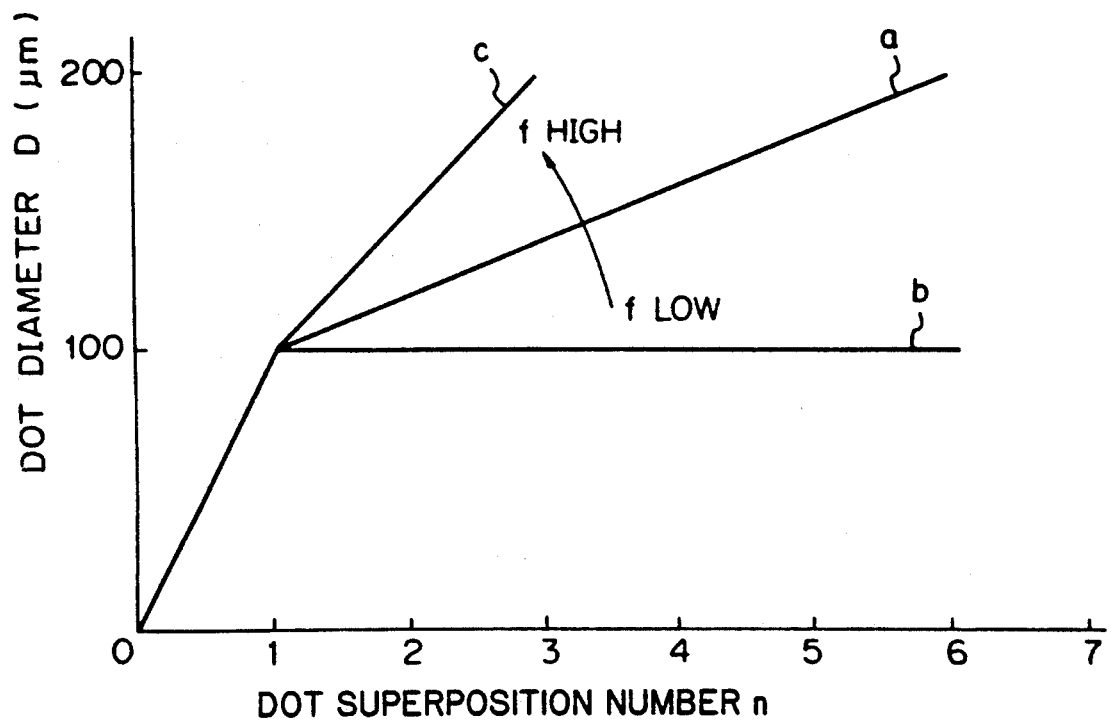
FIG. 27 is a characteristic graph showing the relation between the ink ejection interval and the growth of the dot diameter in the embodiment.

That is, when the ejection signal $S_1$ of the ink jet printer is continuously applied to the ink jet head 122, as shown in c in FIG. 26, an ink 126 is blurred while being united on a paper 127, and the dot diameter increases. On the other hand, when the ink dot printing interval t is widened, as shown in a and b in FIG. 25 and a and b in FIG. 26, although the dot diameter growing rate is low, the saturation and hue due to the superposition can be changed and the concentration of the printed dot itself is also slightly improved. In this manner, in FIGS. 25 and 26, the reason why the ink of the dots printed in accordance with the order of b→a→c is widened is because if the time interval t from the printing of the first dot onto the paper surface until the printing of the next dot is short, the supply speed of the ink droplets is faster than the speed at which the ink permeates the paper in accordance with the order of the first dot, the second dot, the third dot, . . . and the ink is easily spreaded on the paper surface. On the right side in FIG. 26, a state in which the ink permeates the inside of the paper is shown by arrows. FIG. 27 shows the relation between the number of superpositions and the dot diameter. It will be understood that as the superposing interval becomes long, a dot diameter growing rate f decreases.

Therefore, by preparing a number of eight or nine kinds of threshold value matrices in the Z direction, such as matrices that the same image data can be binarized into patterns of (1) 11100000, (2) 10101000, (3) 10010010, . . . , the smooth gradations can be obtained. The brightness, saturation, and hue can be properly controlled.

Figure 28:
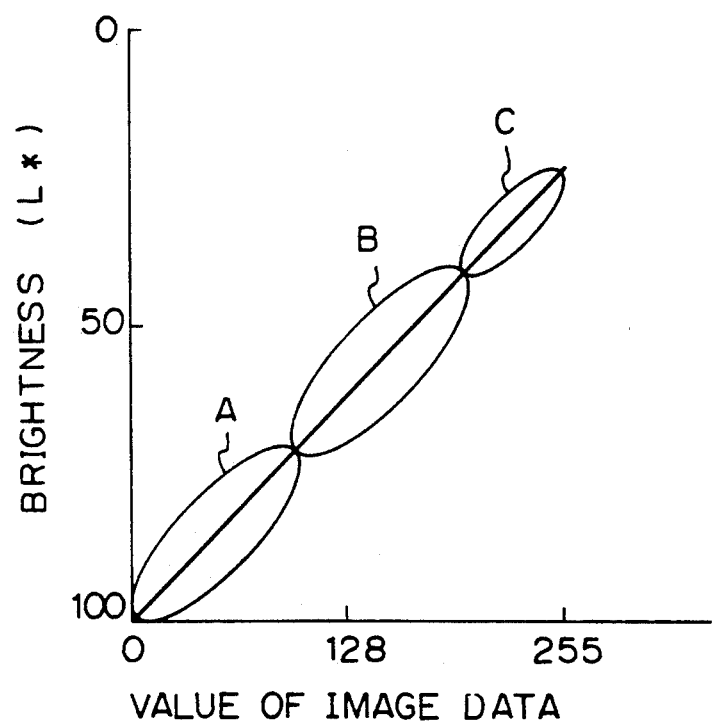
FIG. 28 is a characteristic diagram showing the relation between the value of the input multi-value image data and the brightness (L*)

As mentioned above, the smooth gradations which cannot be expressed by the conventional technique can be obtained by use of the dot diameter growth by the superposition of the ink droplets. Particularly, when the linear relation between the input image data 101 and the brightness as shown in FIG. 28 is derived, in the highlighted portion shown at A or the like, by constituting the threshold value matrices so as to reduce the dot diameter, the graininess becomes inconspicuous.

On the other hand, in the portion of the diagram, even if the dot diameter is small, as the concentration of each dot is high, the contrast seems to be high, so that high resolution is derived and the image can be clearly seen.

On one hand, in the half tone portion, even if the concentration of each dot is low, as the dot diameter is large, the area which is covered by the ink is larger than the background of a material to be recorded, so that the smooth half tone is derived.

Consequently, a check is made to see if the original image is the half tone image or the diagram image and the threshold value matrices are changed in accordance with this result of the discrimination. In the case of the half tone image, matrices so as to obtain the pattern (1) mentioned above are applied for the same image data. In the case of the diagram image, matrices so as obtain the foregoing pattern (3) are applied. In the case where both of the half tone and diagram images mixedly exist, matrices so as to obtain the pattern (2) are applied. Such an embodiment will now be described hereinbelow with reference to FIG. 30.

FIG. 30 is a diagram showing such an embodiment and the parts and components as those shown in FIG. 21 are designated by the same reference numerals and their descriptions are omitted.

In FIG. 30, reference numeral 135 denotes a distinction circuit to discriminate whether the input image data is a diagram image or a half tone image. An output of the distinction circuit 135 is supplied to the pattern memory 111. Threshold value matrices which are generated in accordance with a distinction output of the distinction circuit 135 is considered as the pattern memory 111. For example, if the input image data is determined to be the half tone image, as shown in the pattern (1), threshold value matrices such as to enlarge the dot diameter, i.e., to reduce the ink ejection interval to form dots are generated. In the case of the diagram image, as shown in the pattern (3), threshold value matrices such as to make the concentration thick without growing the dot diameter, namely, to widen the ejection interval of the ink to form the dots are generated.

In the foregoing embodiment, the threshold values which are generated from the pattern memory 111 on the basis of the result of the distinction between the diagram image and the half tone image have been considered. However, it is also possible to consider a constitution such that as shown by broken lines in FIG. 30, a distinction circuit 136 to discriminate whether the input image data is the chromatic image or achromatic image is provided, and on the basis of the result of the distinction, threshold values which are generated from the pattern memory 111 are changed.

In other words, when the chromatic image data is given, the processes are executed in a manner similar to the case of the half tone image. In the case of the achromatic image, the processes can be performed in a manner similar to the case of the diameter image.

With this method, the black characters are reproduced with a high contrast and a high resolution and color images other than the black characters are smoothly reproduced with good gradations.

Hitherto, when the image of a human face is reproduced, the skin color cannot be preferably reproduced. However, according to the embodiment, since the smooth gradations can be obtained, the skin color can be also properly reproduced. On the other hand, if the dot superposing interval t is set to a long time, although the area ratio does not change, the effect by the ink superposition can be derived. Namely, the clearness can be raised by changing the saturation. Thus, the width of expression is widened and the picture quality can be remarkably improved.

Therefore, the advantages which are obtained by the embodiments of the present invention will be summarized as follows.

(1) Since the dots smaller than those of the conventional ones can be used, the bright portion can be further finely expressed.

(2) When the dots having a small diameter are dispersively printed as a whole and the dot diameter is gradually increased by the superposition, the jump of the gradations (i.e., the sudden change in gradation) becomes inconspicuous and the smooth color tone can be expressed.

(3) By superposing the dots without changing the dot diameter, the saturation or hue of the reproduced image can be changed and the clear picture quality can be obtained.

On the other hand, in order to express the fine gradations and to adjust the saturation and hue, it is sufficient to change the bit ejecting interval. The following methods are considered for this purpose.

(1) The dot interval is adjusted by the data in the Z direction of the threshold value matrices as mentioned above.

(2) The addresses of Z in the threshold value matrices are controlled and in order to obtain the binarization data of 0, the 255 threshold value data such that they are certainly set to 0 even when they are compared with the threshold value are read out and compared with the image data.

(3) The frequency of the ejection pulse is changed.

Figure 29:
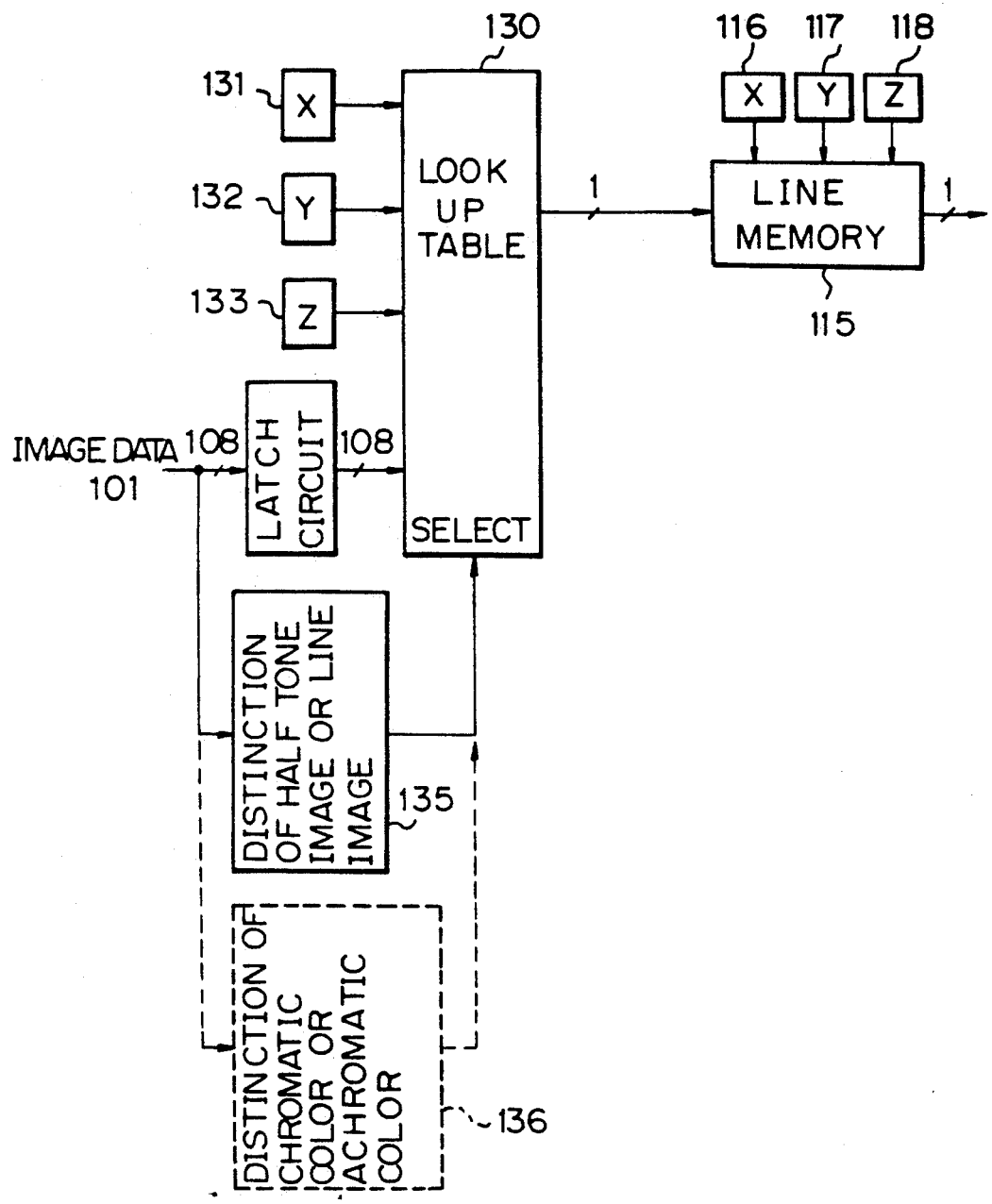
FIG. 29 is a block diagram showing a circuit arrangement of the main section in another embodiment of the invention.

FIG. 29 shows a constitution of the main section in another embodiment of the invention. In this embodiment, the binarization data is accessed from a look-up table 130 together with the addresses indicated by X, Y, and Z for the input multi-value image data 101 and output to the line memory 115. The addresses indicated by the size of the image data 101 and the matrix addresses which are formed by address generators 131 and 132 of X and Y are added and the binarization data is accessed from the look-up table 130. In this case, the Z address from an address generator 133 of Z differs from the X and Y addresses, so that the superposing data can be read out as a different value. The other constitution is similar to the first embodiment of FIG. 21; therefore, its detailed description is omitted.

As explained above, according to this embodiment, in addition to the dot diameter modulation in which a larger dot diameter is accomplished by superposing the dots having a small diameter, the dot printing time interval is adjusted. Therefore, not only the fine gradations are obtained but also there is derived an advantage such that the saturation and hue as the significant factors in the color reproduction can be also properly adjusted.

Thus, according to the embodiment, in the case of an obscure faded picture quality although the smooth gradations can be obtained, by also adjusting the saturation, the image to be printed can be also clarified. On the other hand, according to the embodiment, since the conventional existing ink jet recording apparatus can be also directly improved, this embodiment is practically useful.

What is claimed is:

1. A recording apparatus comprising:
   depositing means for depositing a recording agent on a medium; and
   control means for controlling said depositing means such that said recording agent is deposited at substantially the same position on said medium a plurality of times and a time interval between each deposition of said recording agent at the same position is changed to control a concentration of said recording agent deposited at said same position a plurality of times.

2. An apparatus according to claim 1, wherein said depositing means includes means for depositing ink onto paper.

3. An apparatus according to claim 1, further comprising supply means for supplying image data to said depositing means.

4. An apparatus according to claim 3, further comprising discriminating means for discriminating characteristics of said image data, wherein said control means controls the interval between depositions of said recording agent in accordance with the result of said discrimination of said discriminating means.

5. An apparatus according to claim 1, wherein said control means has a first control mode in which said interval between depositions of said recording agent causes a change in size of a dot formed on said medium by said recording agent when said recording agent is deposited at substantially the same position on said medium a plurality of times, and a second control mode in which said interval between depositions of said recording agent does not cause a change in the size of said dot.

6. An apparatus according to claim 5, wherein in said second control mode, said interval between depositions of said recording agent is sufficient to permit said recording agent to permeate said medium after each said deposition prior to the subsequent said deposition.

7. A recording method comprising:
a first step of depositing a recording agent at a predetermined position on a medium; and
a second step of depositing said recording agent at said predetermined position at a predetermined time interval after said first step such that a dot formed at said predetermined position by succeeding depositions in said first and said second steps has the same size as a dot formed at said predetermined position by deposition in said first step.

8. A method according to claim 7, wherein the recording agent which is deposited in said first step and the recording agent which is deposited in said second step are the same kind of recording agents.

9. A method according to claim 7, further comprising repeating said first and second steps.

10. A method according to claim 7, wherein said recording agent is a liquid having a predetermined concentration.

11. An apparatus according to claim 10, wherein said medium is a medium into which said liquid permeates.

12. A method according to claim 11, wherein said medium is paper.

13. A recording method according to claim 7, wherein a dot of an image is reproducible in different colors without changing the size of the dot formed in said first step.

14. An apparatus comprising:
supply means for supplying multi-value image data;
developing means for developing into binary data said multi-value image data supplied by said supply means;
depositing means for depositing a recording agent on a medium in accordance with said binary data developed by said developing means; and
control means for controlling said developing means to develop the same multi-value image data supplied by said supply means into binary data a plurality of times and controlling said depositing means to deposit said recording agent on said medium a plurality of times such that said recording agent is deposited a plurality of times at a predetermined interval in accordance with each binary data developed from the same multi-value image data by said developing means a plurality of times, wherein said developing means includes:
storing means for storing a plurality of threshold value matrices; and
comparing means for sequentially comparing the plurality of threshold value matrices store din said storing means with the multi-value image data supplied by said supply means.

15. An apparatus according to claim 14, wherein said control means develops said multi-value image data into binary data a plurality of times by using different threshold values.

16. An apparatus according to claim 14, wherein said depositing means superposes and deposits the recording agent at the same position on the medium when depositing the recording agent onto the medium in accordance with the binary data developed by said developing means a plurality of times.

17. An apparatus according to claim 14, wherein said recording agent is a liquid having a predetermined concentration.

18. An apparatus according to claim 17, wherein said medium is a medium into which said liquid permeates.

19. An apparatus according to claim 18, wherein said medium is paper.

20. A recording method comprising:
a first step of depositing a recording agent on a medium; and
a second step of depositing on the medium the same kind of recording agent as said recording agent deposited in said first step after a sufficient time to allow said agent deposited in said first step to permeate into said medium so that a dot formed by succeeding depositions in said first and second steps has the same size as a dot formed by deposition in said first step.

21. A method according to claim 20, wherein in said second step said recording agent is deposited at substantially the same position as that on which said recording agent is deposited in said first step.

22. A method according to claim 20, further comprising repeating said first and second steps.

23. A method according to claim 20, wherein said recording agent is a liquid having a predetermined concentration.

24. A method according to claim 23, wherein said medium is a medium into which said liquid permeates.

25. A method according to claim 24, wherein said medium is paper.

26. A recording method according to claim 20, wherein an image is reproducible in different colors without changing the size of the dot formed in said first step.

* * * * *

UNITED STATES PATENT AND TRADEMARK OFFICE
CERTIFICATE OF CORRECTION

PATENT NO. : 5,252,986
DATED : October 12, 1993
INVENTOR(S) : Makoto TAKAOKA, et al.

It is certified that error appears in the above-indentified patent and that said Letters Patent is hereby corrected as shown below:

COLUMN 2:

Line 12, "the" should be deleted.

COLUMN 3:

Line 36, "to" should read --is to--.

COLUMN 4:

Line 24, "an" should be deleted; and "diagram" should read --diagrams--;
Line 27, "an" should be deleted; and "diagram" should read --diagrams--.

COLUMN 6:

Line 54, "made" should read --made to--;
Line 61, "○1" should read --①--;
Line 62, "FIG. IB" should read --FIG. 1B--.

UNITED STATES PATENT AND TRADEMARK OFFICE
CERTIFICATE OF CORRECTION

PATENT NO. : 5,252,986
DATED : October 12, 1993
INVENTOR(S) : Makoto TAKAOKA, et al.

It is certified that error appears in the above-indentified patent and that said Letters Patent is hereby corrected as shown below:

COLUMN 7:

Line 21, "◯1" should read --①--;
Line 22, "◯4" should read --④--.

COLUMN 8:

Line 54, "func-" should read --and func- --.

COLUMN 11:

Line 25, "supply 102," should read --supply means 102,--;
Line 28, "discriminating 111" should read --discriminating means 111--.

COLUMN 12:

Line 25, "spreaded" should read --spread--.

UNITED STATES PATENT AND TRADEMARK OFFICE
CERTIFICATE OF CORRECTION

PATENT NO. : 5,252,986
DATED : October 12, 1993
INVENTOR(S) : Makoto TAKAOKA, et al.

It is certified that error appears in the above-indentified patent and that said Letters Patent is hereby corrected as shown below:

COLUMN 15:

Line 38, "An apparatus" should read --A method--.

COLUMN 16:

Line 10, "store din" should read --stored in--.

Signed and Sealed this

Thirtieth Day of August, 1994

*Attest:*

BRUCE LEHMAN

*Attesting Officer*      *Commissioner of Patents and Trademarks*